(12) United States Patent
Jadrich et al.

(10) Patent No.: US 7,842,928 B2
(45) Date of Patent: Nov. 30, 2010

(54) COMPACT AND DURABLE ENCASEMENT FOR A DIGITAL RADIOGRAPHY DETECTOR

(75) Inventors: Bradley S. Jadrich, Rochester, NY (US); Mark D. Bedzyk, Pittsford, NY (US)

(73) Assignee: Carestream Health, Inc., Rochester, NY (US)

( * ) Notice: Subject to any disclaimer, the term of this patent is extended or adjusted under 35 U.S.C. 154(b) by 0 days.

(21) Appl. No.: 12/714,663

(22) Filed: Mar. 1, 2010

(65) Prior Publication Data

US 2010/0158197 A1 Jun. 24, 2010

Related U.S. Application Data

(62) Division of application No. 12/354,839, filed on Jan. 16, 2009, which is a division of application No. 11/441,584, filed on May 26, 2006, now Pat. No. 7,495,226.

(51) Int. Cl.
*G01T 1/20* (2006.01)
*H01L 27/146* (2006.01)

(52) U.S. Cl. .............................. 250/370.11; 250/370.09

(58) Field of Classification Search ............ 250/370.11, 250/370.09
See application file for complete search history.

(56) References Cited

U.S. PATENT DOCUMENTS

| | | | |
|---|---|---|---|
| 5,650,626 A | 7/1997 | Trauernicht et al. | |
| 5,844,961 A | 12/1998 | McEvoy et al. | |
| 5,912,914 A | 6/1999 | Dittbenner | |
| 5,912,944 A | 6/1999 | Budinski et al. | |
| 6,296,386 B1 | 10/2001 | Heidsieck et al. | |
| 6,700,126 B2 | 3/2004 | Watanabe | |
| 6,805,484 B2 | 10/2004 | Kuramoto et al. | |
| 6,855,936 B2 | 2/2005 | Yamamoto | |
| 7,181,096 B2 | 2/2007 | Matsumoto et al. | |
| 7,190,759 B2 | 3/2007 | Ratzmann | |
| 7,482,595 B1 * | 1/2009 | Ertel | 250/370.09 |
| 7,566,169 B2 * | 7/2009 | Jakob et al. | 378/189 |
| 2002/0181659 A1 * | 12/2002 | Watanabe et al. | 378/189 |
| 2002/0195568 A1 | 12/2002 | Mori et al. | |
| 2004/0227096 A1 | 11/2004 | Yagi | |
| 2005/0017188 A1 | 1/2005 | Yagi | |
| 2006/0065846 A1 | 3/2006 | Ertel et al. | |
| 2006/0067474 A1 | 3/2006 | Schmitt | |

FOREIGN PATENT DOCUMENTS

EP  1 489 436 A1  12/2004

\* cited by examiner

*Primary Examiner*—David P Porta
*Assistant Examiner*—Mindy Vu

(57) ABSTRACT

A digital radiography detector includes a housing and a radiographic image detector assembly. The housing has a first and second spaced planar members and four side walls defining a cavity. The radiographic image detector assembly is mounted within the cavity for converting a radiographic image to an electronic radiographic image. The detector assembly includes a scintillator screen and a detector array, and the detector assembly is bonded to the first planar member of the housing.

6 Claims, 23 Drawing Sheets

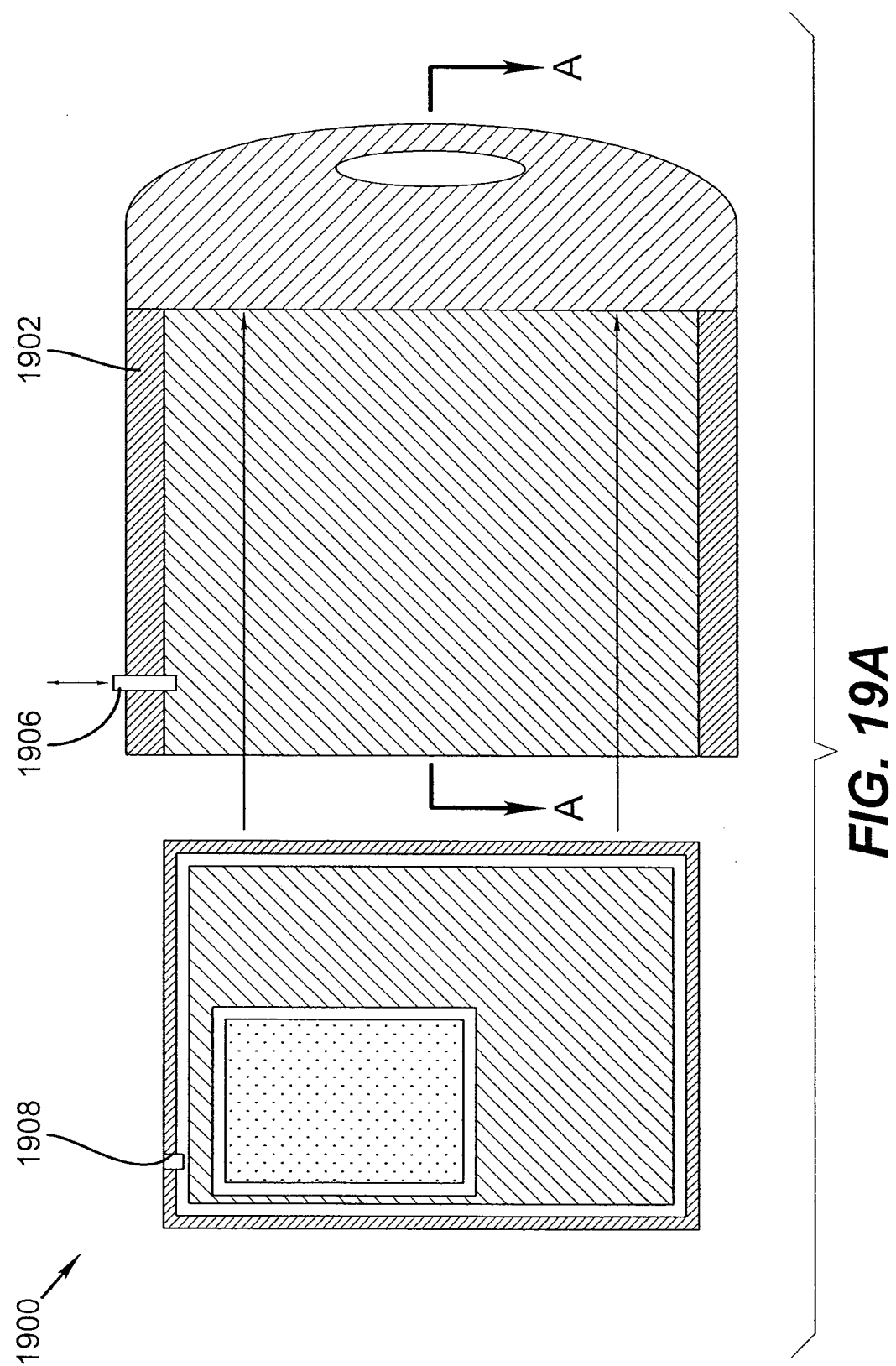

COMPACT AND DURABLE ENCASEMENT FOR A DIGITAL RADIOGRAPHY DETECTOR

CROSS REFERENCE TO RELATED APPLICATIONS

This is a Divisional of commonly assigned application U.S. Ser. No. 12/354,839, entitled "COMPACT AND DURABLE ENCASEMENT FOR A DIGITAL RADIOGRAPHY DETECTOR", filed on Jan. 16, 2009 in the names of Jadrich et al., which is a Divisional of U.S. Ser. No. 11/441,584 entitled "COMPACT AND DURABLE ENCASEMENT FOR A DIGITAL RADIOGRAPHY DETECTOR", filed on May 26, 2006 now U.S. Pat. No. 7,495,226 in the names of Jadrich et al.

FIELD OF THE INVENTION

This invention relates in general to medical imaging systems which use digital radiography detectors, and more particularly to a compact and durable encasement or housing for a digital radiography detector.

BACKGROUND OF THE INVENTION

Traditional film-screen radiography has been used as a medical imaging diagnostic system for many years. X-rays are projected through a patient's body part to form a latent radiographic image on film contained in a cassette. The film is then be chemically or thermally processed to produce a visual radiographic image which can be used by a health care professional for diagnostic purposes. The delay in obtaining a diagnostic image, the use of a chemical or thermal processor, and the difficulty in providing the radiographic film outside of the immediate medical facility, has resulted in the development of digital radiographic imaging systems. Computed radiography (CR) digital systems have been developed in recent years that provide reusable CR plates which are scanned to produce a digital radiographic image. The CR systems still result in a delay in obtaining a diagnostic image due to the necessity of scanning an exposed CR plate.

Digital radiography is achieving a growing acceptance as an alternative to film-screen and CR radiography systems. With digital radiography (DR), the radiation image exposures captured on radiation sensitive layers are converted, pixel by pixel, to digital image data which is stored and subsequently displayed on electronic display devices. One of the driving forces in the success of digital radiography is the ability to rapidly visualize and communicate a radiographic image via networks to a remote location for analysis and diagnosis by radiologists without the delay in sending chemically or thermally processed radiographic films by courier or through the mail. The use of chemical or thermal processors is also eliminated by digital radiography systems.

The solid-state, ionizing radiation based image detectors used in projection digital radiography today are relatively large, heavy, and expensive. Additionally, a complete DR systems using this type of detector (hereafter DR detector) requires substantial capital investment to retrofit with existing X-ray equipment. For projection radiography, the detector array in these systems is typically a large-area pixilated device, fabricated on a glass substrate. The large-area detector array is expensive to fabricate, and it is also fragile to handle since the substrate is glass. As a result, DR detectors and systems are very expensive and the current market is small given the high cost of investment.

DR detectors can either be direct or indirect conversion devices. Direct detectors use a material such as selenium in contact with a TFT array for conversion of X-ray photons. Indirect detectors use a scintillator screen for conversion of X-rays to visible light, through contact with a silicon photodiode and TFT array.

The dimensions of medical radiographic cassettes/screens/films are specified under ISO 4090:2001(E) standard. This includes both conventional film and CR phosphor screens, with nominal imaging areas up to 35 cm×43 cm and 40 cm×40 cm (metric origin). Standard cassette dimensions are also specified as part of the ISO standard, including the maximum cassette thickness of 16.0 mm.

U.S. Pat. No. 5,844,961, issued Dec. 1, 1998, inventors McEvoy et al., discloses a filmless digital x-ray system that uses a standard x-ray cassette housing. An external power source provides the power for the detector and associated electronic system.

U.S. Patent Application Publication No. 2004/0227096, published Nov. 18, 2004, inventor Yagi, discloses a metal spring assembly for providing shock isolation to a radiation detector that provides limited shock isolation due to the stiffness of the metal type spring.

U.S. Patent Application Publication No. 2005/0017188, published Jan. 27, 2005, inventor Yagi, discloses means to provide shock isolation to a radiation detector, in which shock absorption material is provided between inner and outer frames. This structure increases the size of the cassette.

U.S. Pat. No. 6,296,386, issued Oct. 2, 2001, inventors Heidsieck et al., discloses a cassette for producing images for a radiography apparatus intended for mobile type cassettes. A handle and locking means are disclosed for locating the cassette within a reception housing. It is intended for use with mammography exposure devices, where locking features are advantaged since the reception housing can be in multiple orientations, where the cassette would be susceptible to dropping. The features disclosed are larger than the standard cassette and extend to contact the reception housing. This can limit its usage to specific types of x-ray equipment.

U.S. Pat. No. 6,855,936, issued Feb. 15, 2005, inventor Yamamoto, discloses a cassette for use in a portable imaging environment. The cassette has a plurality of electrical connecting ports and a plurality of fixed handles. These allow for multiple detector orientation for specific radiographic exposures.

U.S. Pat. No. 6,805,484, issued Oct. 19, 2004, inventors Kuramoto et al., discloses a portable device with at least one handle secured to the device housing. This handle is movably connected or pivoted, for the purpose of facilitating patient positioning only.

U.S. Pat. No. 6,700,126, issued Mar. 2, 2004, inventor Watanabe, discloses a radiation detector which includes a shock absorber placed on any one of the side walls of the cassette. While this provides some lateral protection to the detector, it does not provide protection in the direction orthogonal to the detector plane.

Accordingly, there is a need for a DR detector system that provides a compact encasement for housing the glass detector and supporting electronics so that it fits within the volume of existing standard film cassettes and meets the requirements of the ISO standard. There is also a need for a durable structure that protects the fragile detector from damage, due to physical shock or loads applied externally to the encasement. It is also desirable that the DR detector be usable for both typical x-ray exam room procedures as well as with portable imaging equipment. There is also a need that the detector be wireless, especially for portable imaging equipment where any electrical cables can interfere with user operation and handling of the portable detector.

SUMMARY OF THE INVENTION

The present invention is directed to providing a system which addresses the problems and the needs discussed above.

According to one aspect of the present invention there is provided a digital radiography detector comprising: a housing having first and second spaced planar members and four side walls defining a cavity; a radiographic image detector assembly mounted within the cavity for converting a radiographic image to an electronic radiographic image, wherein the detector assembly includes a detector array mounted on a stiffener; and a shock absorbing elastomer assembly located within the cavity for absorbing shock to the detector array/stiffener in directions perpendicular to and parallel to the detector array/stiffener.

According to another aspect of the present invention there is provided a digital radiography detector comprising: a housing having first and second spaced planar members and four side walls; a radiographic image detector assembly mounted within the cavity for converting a radiographic image to an electronic radiographic image, wherein the detector assembly includes a screen and a detector array; and wherein the detector assembly is bonded to the first planar member of the housing.

According to a further aspect of the present invention there is provided a digital radiography detector assembly comprising: a digital radiography detector having a housing having upper and lower planar members and four side walls; and a portable assembly detachably mounted to the detector; wherein the portable assembly includes at least one handle detachably mounted to a side wall of the detector housing.

According to still another aspect of the present invention, there is provided a digital radiography detector assembly comprising: a digital radiography detector having a housing having upper and lower planar members and four side walls; and a portable assembly detachably mounted to the detector; the portable assembly includes a portable carrier having a cavity for detachably enclosing the detector within the cavity of the carrier.

BRIEF DESCRIPTION OF THE DRAWINGS

The foregoing and other objects, features, and advantages of the invention will be apparent from the following more particular description of the embodiments of the invention, as illustrated in the accompanying drawings. The elements of the drawings are not necessarily to scale relative to each other.

FIGS. 19A and 19B are respective top plan and side elevational diagrammatic views showing a detachable carrier of an embodiment of the present invention.

DETAILED DESCRIPTION OF THE INVENTION

Figure 1:
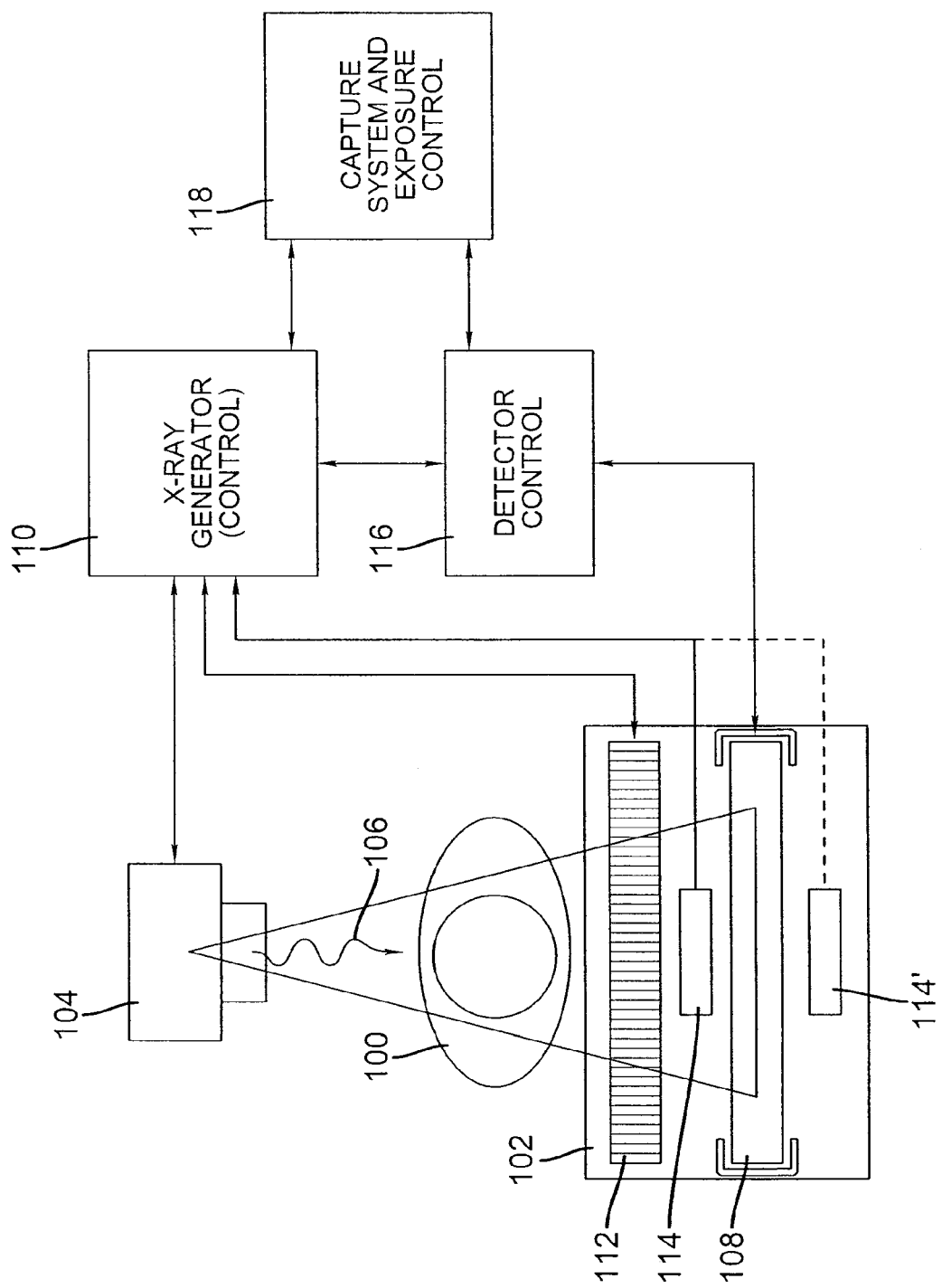
FIG. 1 is a diagrammatic view of typical x-ray equipment in today's x-ray examination room.

The following is a detailed description of the preferred embodiments of the invention, reference being made to the drawings in which the same reference numerals identify the same elements of structure in each of the several figures.

Referring now to FIG. 1, there is shown diagrammatically typical projection x-ray equipment used in an x-ray examination room. As shown, a patient 100 is positioned on a support 102. An x-ray source 104 projects x-rays 106 through a body part of patient 100 to form a radiographic image of the body part which is detected by a digital detector housed in radiography cassette 108 mounted in support 102. X-ray source 104 is activated and controlled by x-ray generator and control 110. Support (Bucky) 102 can also house an antiscatter grid 112, an auto exposure control sensor 114, 114' (located above the radiography cassette for general radiography and below the radiography cassette for mammography). Detector control 116 is linked to the digital detector in cassette 108 and to capture system and exposure control 118. Antiscatter grid 112 and auto exposure control 114, 114' are linked to x-ray generator and control 110 which is linked to computer 110.

There are numerous types of x-ray equipment and configurations designed for specific radiographic procedures. These can include wall-stand, floor-mount, chest, or table units; designed for supine, upright, or other patient orientations. Major manufacturers of traditional x-ray equipment include, for example, Siemens, Philips, and General Electric. It has been estimated that worldwide volumes of traditional x-ray equipment is well over 100,000 units. Because of these large volumes, it is an object of the present invention to replace/retrofit film or CR screen cassette with a digital radiography detector that fits within the same cassette volume accepted by x-ray equipment.

Figure 2:
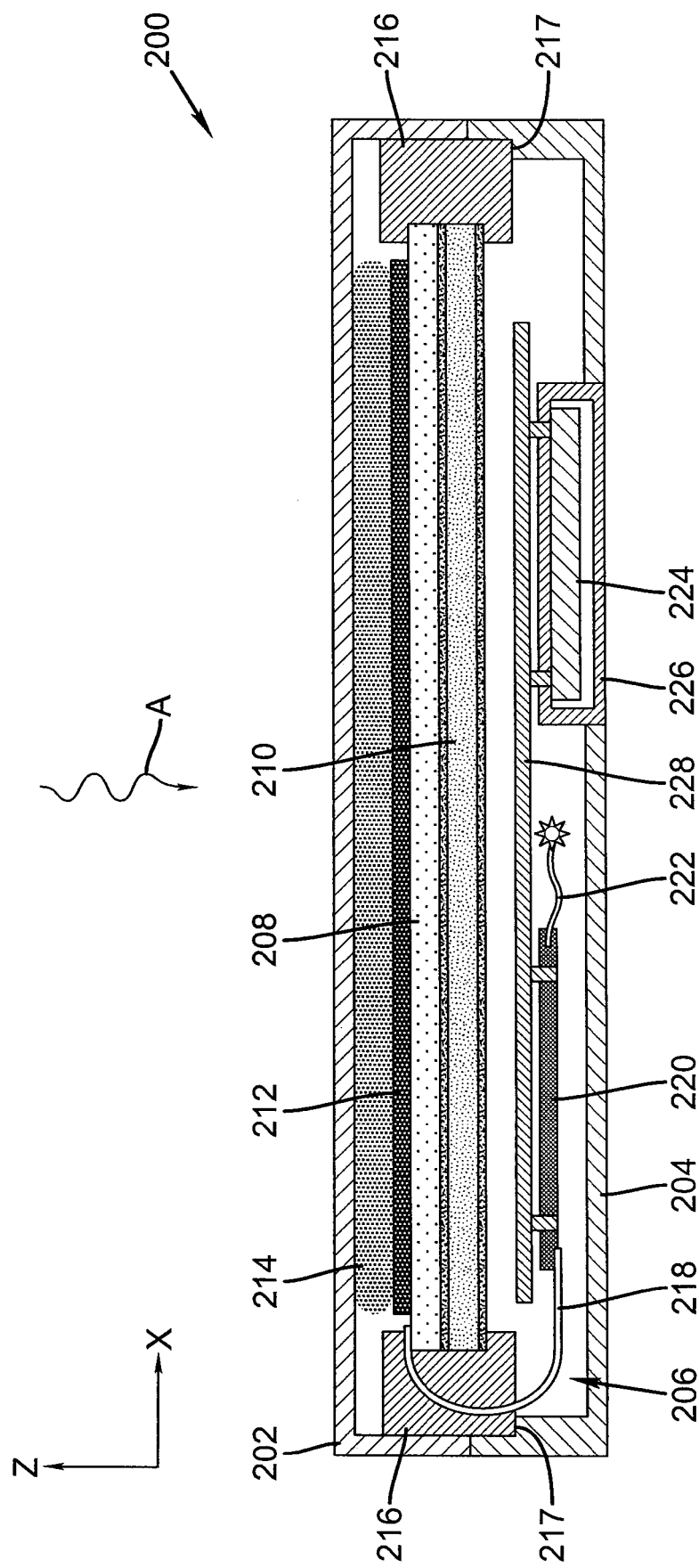
FIG. 2 is a cross-sectional, elevational, diagrammatic view showing a single foam preload of an embodiment of the present invention.
Figure 3:
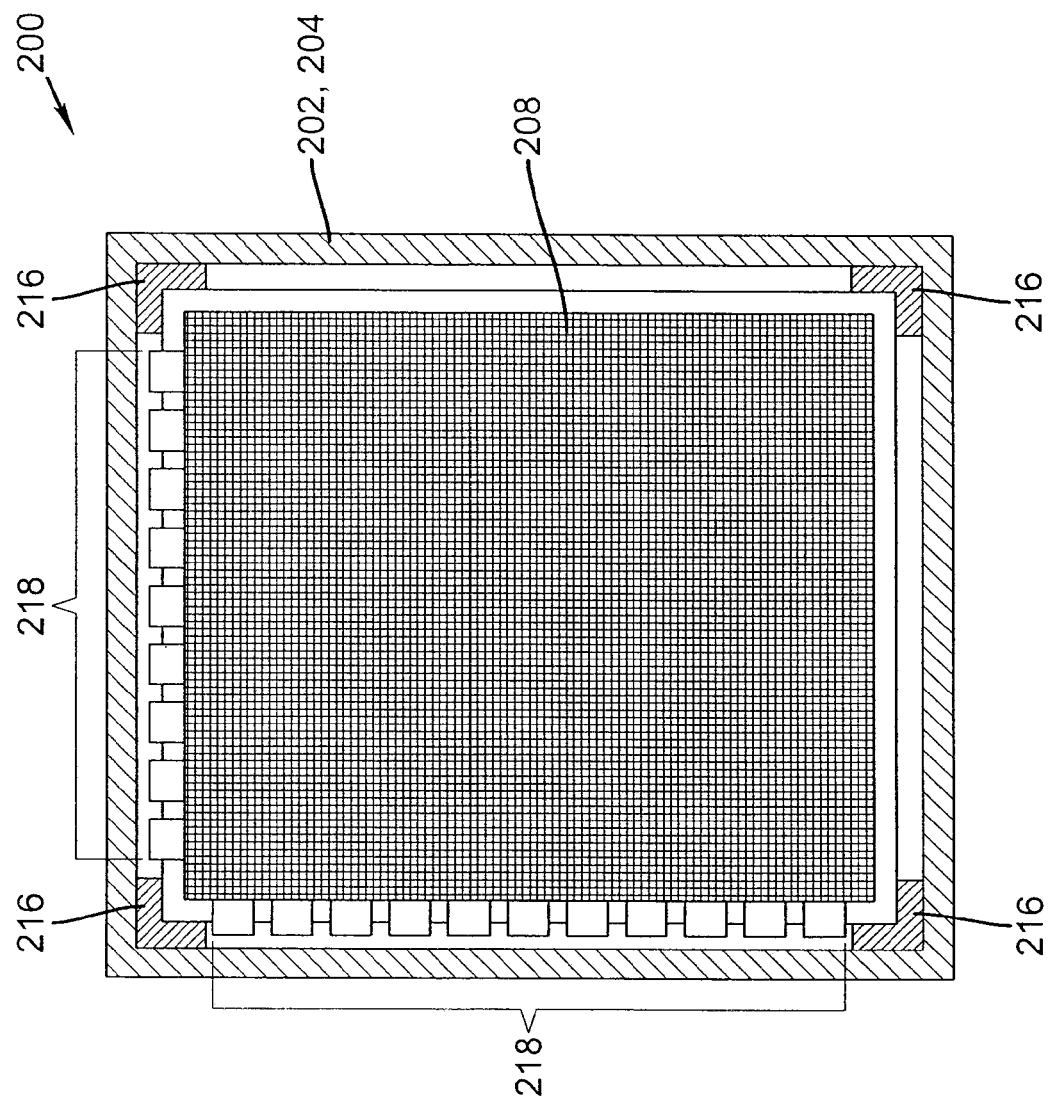
FIG. 3 is a sectional, top plan, diagrammatic view showing encapsulated corner elastomers of an embodiment of the present invention.

An embodiment of the present invention is shown in FIGS. 2 and 3. As shown, DR detector 200 includes upper housing 202, lower housing 204, secured together and forming a cavity 206. Mounted within cavity 206 are detector array 208 mounted on stiffener 210, screen (scintillator) 212, compliant foam member 214, elastomer shock-absorbing supports 216 mounted on stop ledges 217 of lower housing 206, flex circuits 218 connected between detector array 208 and electronics 220. A wireless interface 222 is connected to electronics 220. A battery pack 224 is mounted in a compartment 226 of lower housing 204. Battery pack 224 and electronics 220 are thermally coupled to sheet metal member 228 which acts as a heat sink for heat generated by battery pack 224 and electronics 220. X-rays are projected to detector 200 in the direction of arrow A.

Indirect DR systems use an intensifying phosphor screen (scintillator) 212 to convert x-ray radiation into visible light. A detailed explanation of this conversion process and detection system is disclosed in U.S. Pat. No. 5,650,626, issued Jul. 22, 1997, entitled "X-ray Imaging Detector with Thickness and Composition Limited Substrate", inventors Trauernicht et al. The embodiment of FIGS. 2 and 3 has the scintillator screen 212 placed in contact with detector array 208 by means of compliant foam member 214 which applies and maintains this physical contact. Physical contact between screen 212 and detector array 208 can also be applied by means such as a spring or a plurality of springs. Further, an index-matching type optical adhesive could be used to bond screen 212 directly to detector array 208, so that compliant foam member is not needed. It is important that physical contact be maintained across the entire active area of the detector array 208, so that uniform and efficient transfer of the converted visible light is achieved.

To comply with ISO 4090.2001(E) standard, packaging of the detector array and supporting electronics becomes very challenging. There is limited space for these components in all directions (X, Y, Z). First, flex circuits connecting the detector array and electronics need to be wrapped underneath the array. Second, use of a self-contained battery and battery pack within the DR detector is preferred. In order to comply with the 16 mm cassette thickness, the self-contained battery and battery pack needs to be extremely thin. For example, a lithium polymer rechargeable battery such as Ultralife UBC36106102 could be used. This type of rechargeable battery is only 4.0 mm thick. It is noted that the present invention is not limited to a self-contained battery, but could be energized through an external power source. Detector array 208 is fabricated onto a substrate material such as Corning 1737 display glass, for example, or a substrate with a chemical composition, such as disclosed in U.S. Pat. No. 5,650,626. Display glass is typically 0.7 mm thick, and susceptible to breakage, especially when a large-area, such as 43 cm×43 cm, is used. For durability reasons, the detector array 208 is attached to a stiffener 210 in an embodiment of the present invention. The stiffener is made of a lightweight composite that has similar thermal coefficient of expansion to the substrate material, but significantly higher bending stiffness than the substrate. For example, the composite can be made of a core using Rohacell IG closed-cell rigid foam, sandwiched between thin plies of directionally oriented carbon fiber.

Attachment of detector array 208 to stiffener 210 can be applied using a double-sided pressure sensitive tape such as 3M 9832HL, for example, or a removable thermal release adhesive such as Nitto Denko REVALPHA. Bending stiffness of the composite should be on the order of 10× greater than the substrate material. This will result in the composite supporting the substrate material in such a way as to minimize deflection under extreme load or shock conditions. Otherwise, fracture or breakage of the substrate material could occur. So that the detector 208 and stiffener 210 do not distort under an operational temperature range, it is desirable that the Coefficient of Thermal Expansion (CTE) of the detector 208 and stiffener 210 be similar Display glass has a CTE around $4×10-6$ per degrees C., whereas carbon fiber based composites can range between: $-0.5×10-6$ and $+5.0×10-6$ per degrees C., depending on the type of fiber, fiber orientation, and core material used. The uniqueness of the composite structure is that the fiber type and orientation can be adjusted to obtain desired thermal characteristics. Similar composite structures are being used today to mount large glass telescope mirrors for space exploration.

As shown in FIGS. 2 and 3, the attached detector 208 and stiffener 210 are mounted to elastomer supports 216 for protection against external shock and vibration, which further enhances the durability of the overall DR detector 200. Four encapsulated elastomer supports 216 are each located in the four corners of the detector/stiffener panel 208/210. The elastomer support 216 should be relatively flexible to absorb shock. For example, a polyurethane type material with a hardness of 20-40 Shore A durometer could be used. The elastomer supports 216 are held against and within mating corners of upper and lower housings 202, 204.

Figure 4:
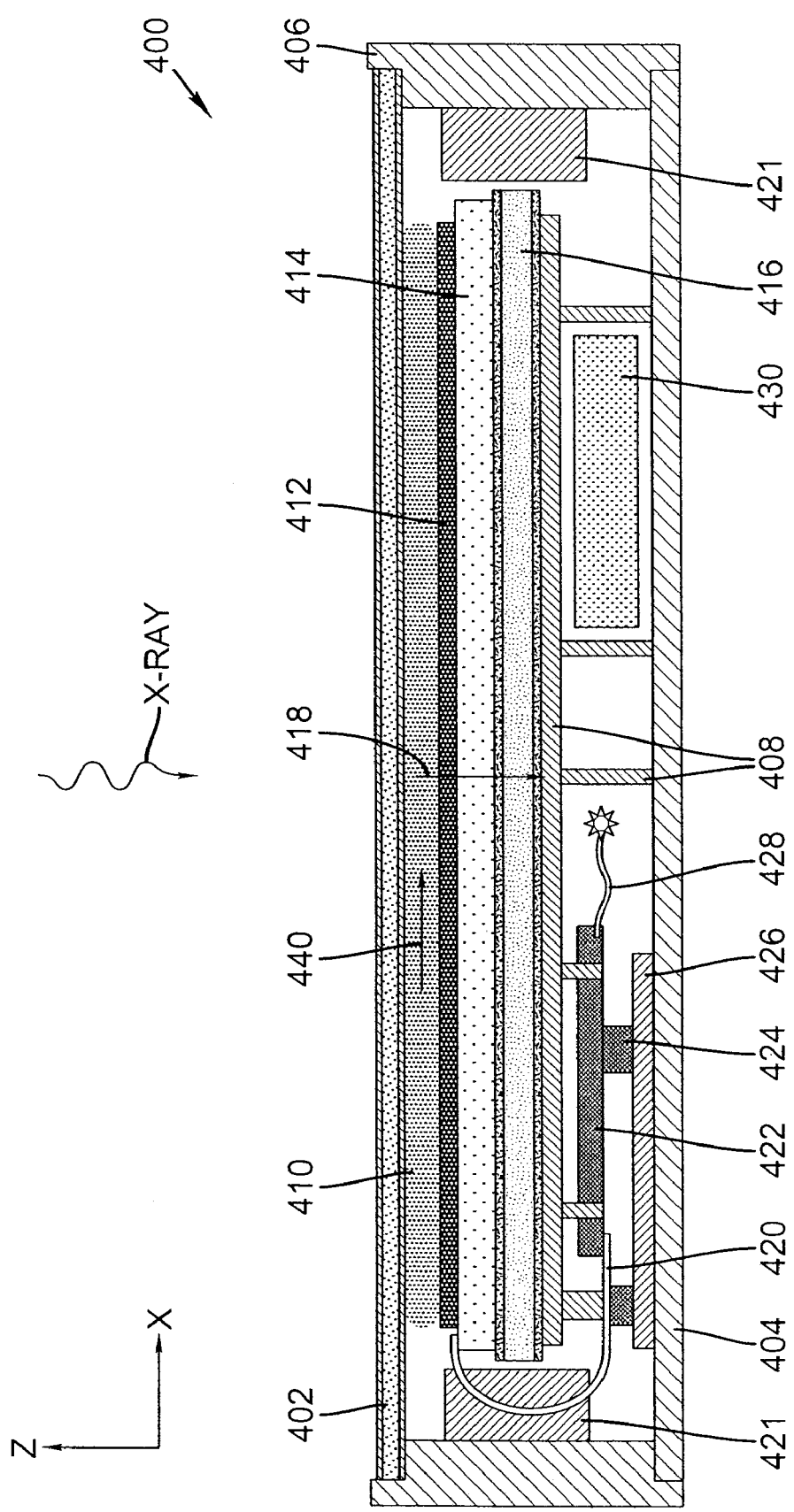
FIG. 4 is a cross-sectional, elevational, diagrammatic view showing an alternate single foam preload of an embodiment of the present invention.

As shown in FIG. 4, DR detector 400 includes upper and lower casings 402 and 404 mounted to four-sided external frame 406. An internal frame 408 is mounted to lower casing 404. Foam layer 410 preloads screen 412, detector 414, stiffener 416 in the direction of arrow 418 against inner frame 408. Inner frame 408 can be attached to stiffener 416 via adhesive or conventional fasteners for locating components in the lateral or X direction. There are column features on the inner frame 408 that locate the inner frame 408 against lower casing 404. Flexible circuit 420 is also provided. Elastomer members 421 are used as a buffer against physical shock in the X direction, and further aid in keeping the preloaded components centered in the housing. Further foam layer 410 provides shock isolation in the Z direction, while at the same time provides an alternate means of isolation in the X direction, through shearing of the foam layer in the direction of arrow 440. Electronics 422 and 424 can have a heat conduction path directly through the lower casing via thermal pad 426. An antenna 428 and battery 430 are also included in detector 400.

Figure 5:
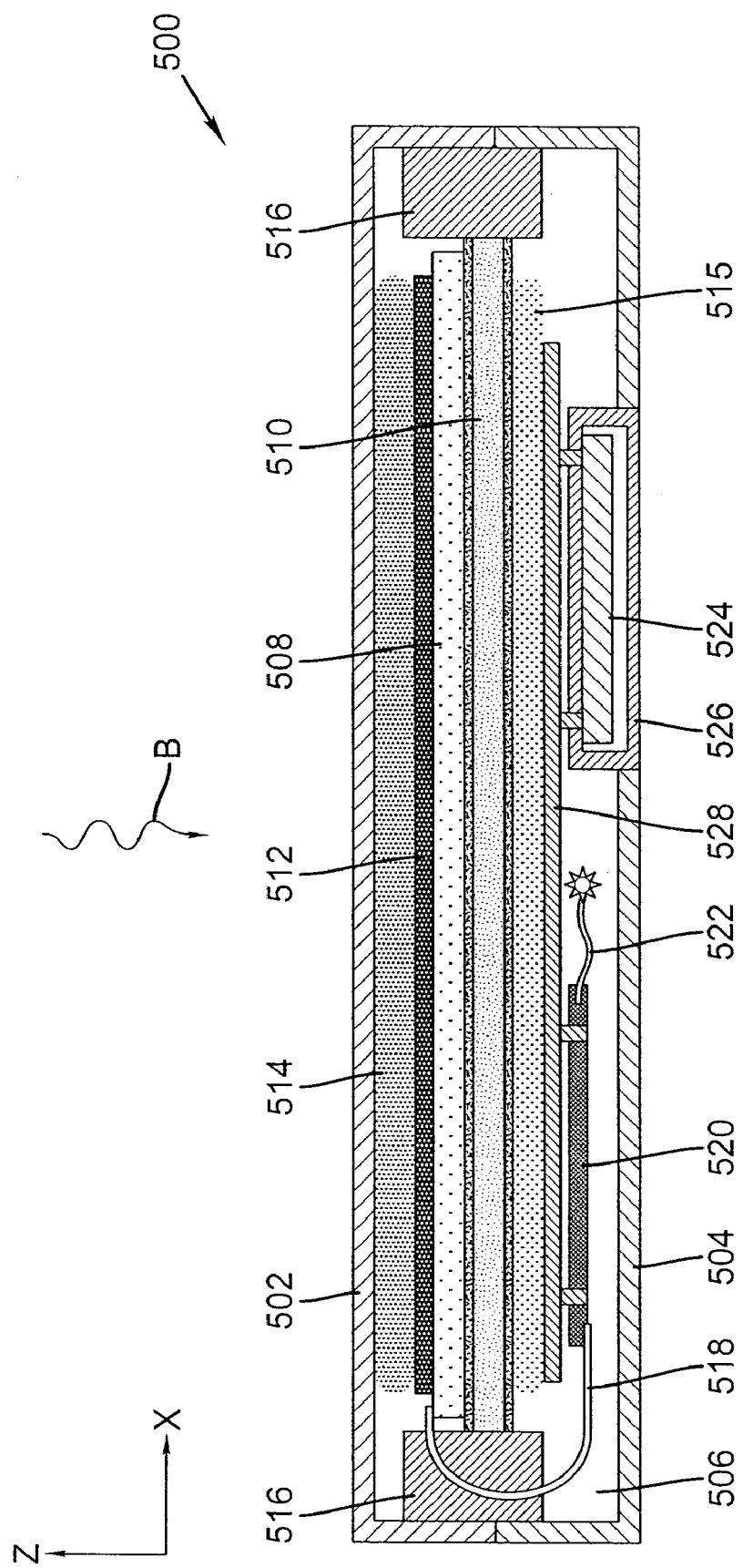
FIG. 5 is a cross-sectional, elevational diagrammatic view showing dual foam preload of an embodiment of the present invention
Figure 6:
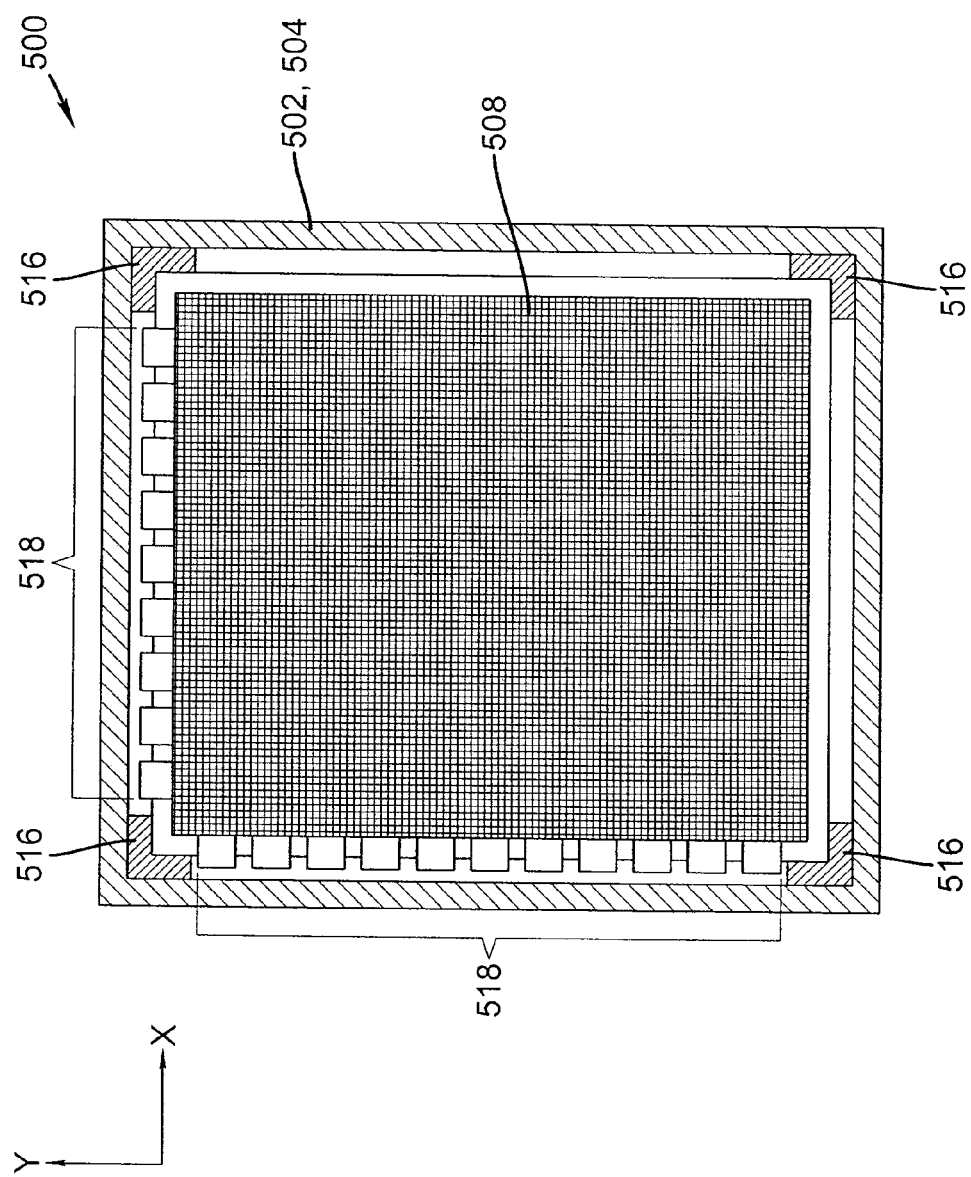
FIG. 6 is a sectional, top plan diagrammatic view showing corner elastomer of an embodiment of the present invention.

FIGS. 5 and 6 show a modification of the DR detector shown in FIGS. 2 and 3. As shown DR detector 500 includes upper housing 502, lower housing 504, secured together and forming a cavity 506. Mounted within cavity 506 are detector array 508 mounted on stiffener 510, screen (scintillator) 512, compliant foam members 514 and 515, elastomer shock-absorbing supports 516, flex circuits 518 connected between detector array 508 and electronics 520. A wireless interface 522 is connected to electronics 520. A battery pack 524 is mounted in a compartment 526 of lower housing 504. Battery pack 524 and electronics 520 are thermally coupled to structural member 528 which acts as a heat sink for heat generated by battery pack 524 and electronics 520. X-rays are projected to detector 500 in the direction of arrow B. In this embodiment, foam members 514, 515 support both front and back of the detector array—stiffener pair 508, 510. There are advantages of this configuration. First, uniform pressure is applied by means of the foam to both sides of the detector array 508 and stiffener 510, resulting in no static deformation of this pair. Second, there will not be any localized stress applied to the corners of the pair since the corner elastomer supports do not encapsulate the pair.

Figure 7:
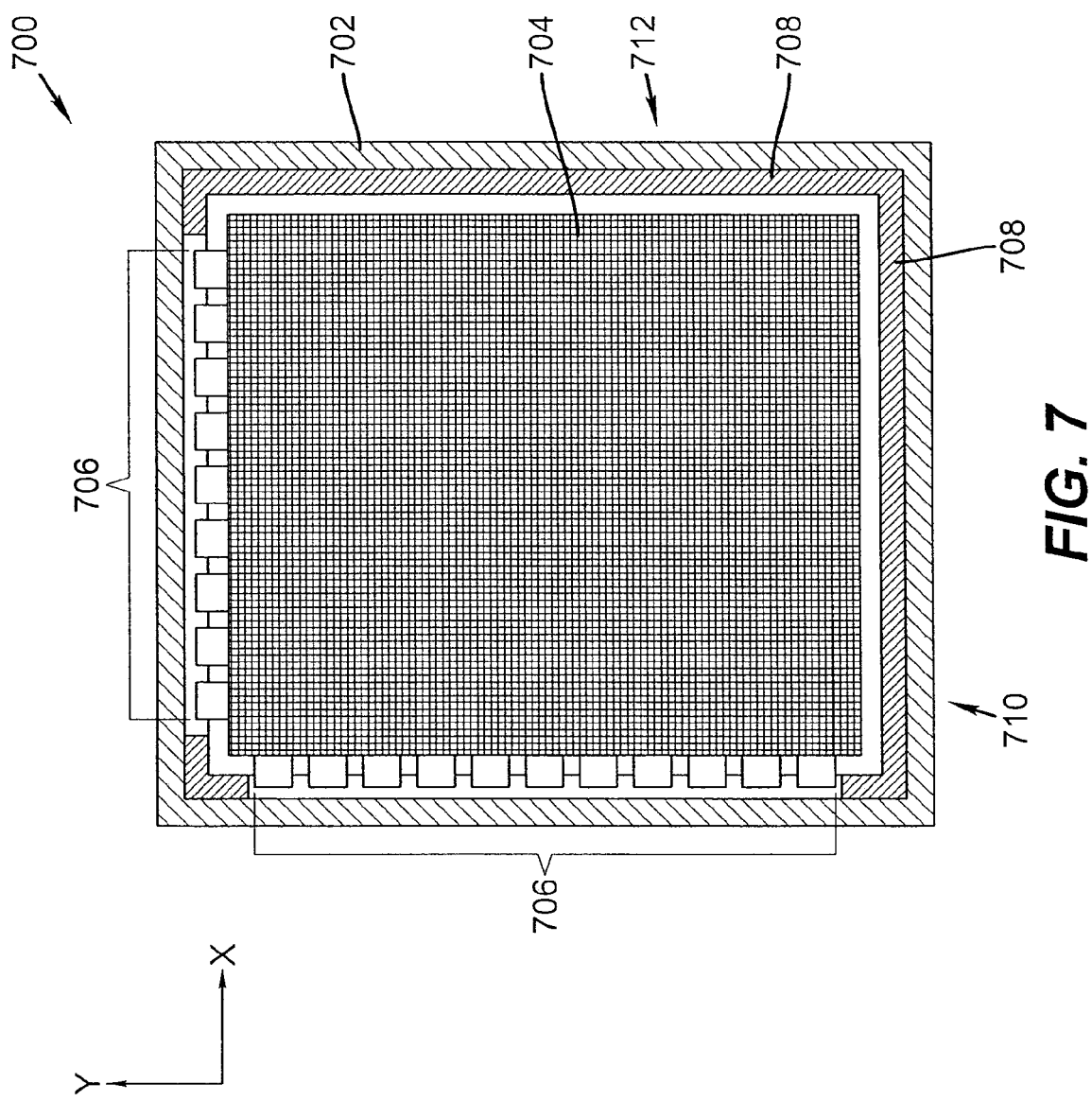
FIG. 7 is a sectional, top plan, diagrammatic view showing full edge elastomer of an embodiment of the present invention.

FIG. 7 shows an embodiment of the invention where the corner elastomer supports are replaced with elastomer supports along two full edges of the detector. For ease of discussion, only components are shown to illustrate the embodiment. As shown, DR detector 700 includes a housing 702, detector array 704, with flex circuits 706. Elongated elastomer supports 708 are located along edges 710 and 712 where flex circuits 706 are not located. If flex circuits are needed on all four sides, this arrangement would not be possible. The advantage of this embodiment is that having additional contact along the width and length can further reduce stress imparted to the detector array 704.

Figure 8:
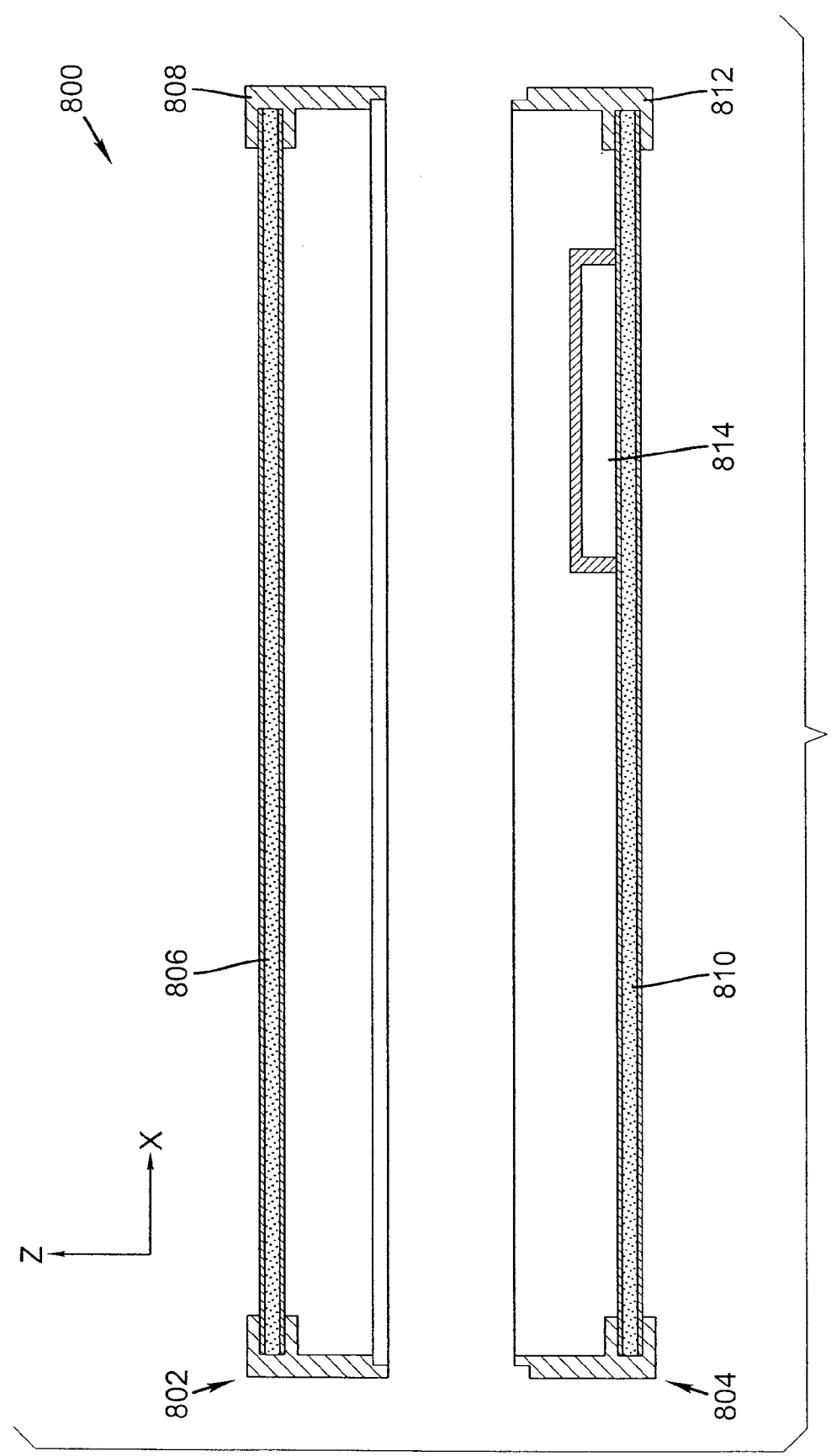
FIG. 8 is a cross-sectional, elevational, diagrammatic view showing the encasement/housing construction of an embodiment of the present invention.

FIG. 8 shows construction of the housing of the DR detector. As shown, DR detector 800 has upper housing 802 and lower housing 804. Upper housing 802 has upper casing 806 and upper frame 808, while lower housing 804 has lower casing 810 and lower frame 812. Lower casing 810 has battery pack holder 814. Upper and lower casings 806, 810 are preferably a lightweight composite, similar to that disclosed in U.S. Pat. No. 5,912,944, issued on Jun. 15, 1999, inventor Budinski et al. The composite disclosed is a composite structure of polypropylene core, sandwiched between thin aluminum sheets. This composite material is manufactured by Corus, under the product name HYLITE™. In addition to being light in weight, this material has high stiffness needed for durability of the housing. Similarly, a carbon fiber based composite like that of the stiffener could be used. Several tradeoffs need to be considered using a composite material in this application, as follows: a) overall weight, b) material cost, c) radiographic absorption, and d) material stiffness. Several of these parameters are discussed in detail in U.S. Pat. No. 5,912,914, issued Jun. 15, 1999, inventor Dittbenner.

Figure 11:
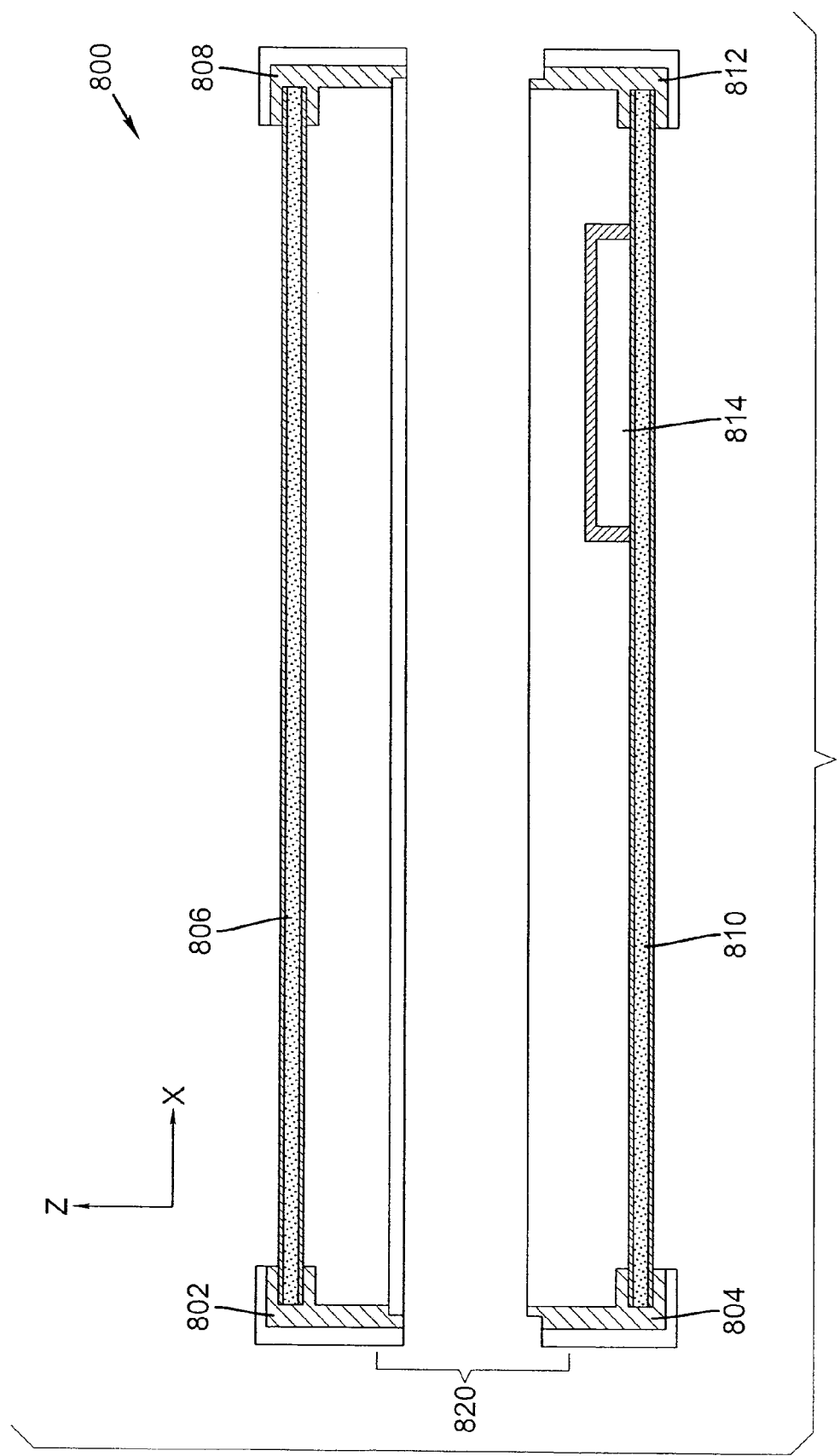
FIG. 11 is a cross-sectional, elevational, diagrammatic view showing an encasement/housing with exterior bonded elastomer of an embodiment of the present invention.

As further shown in FIG. 8, upper and lower frame sections 808 and 812 are attached directly to the upper and lower casings 806 and 810, respectively. Frames 808 and 812 add stiffness to the relatively thin casings 806, 810, and are preferably made of a material with a high stiffness to weight ratio. The high stiffness is needed for durability reasons, so the housing does not distort under extreme load or shock conditions. Materials such as aluminum, magnesium, and titanium fit in this category. However, filled thermoplastics can be considered as well, and may have some advantage for potential injection molding the frame directly to the casings. The lower casing in a DR detector configuration with self-contained power would require a pocket, e.g., pocket 814, for mounting a battery pack holder. A modification of the detector housing of FIG. 8 is shown in FIG. 11. As shown, a thin bonded elastomer 820 surrounds the exterior portions of frames 808 and 812. This provides additional protection against shock and damage to the detector housing and internal components.

Figure 9:
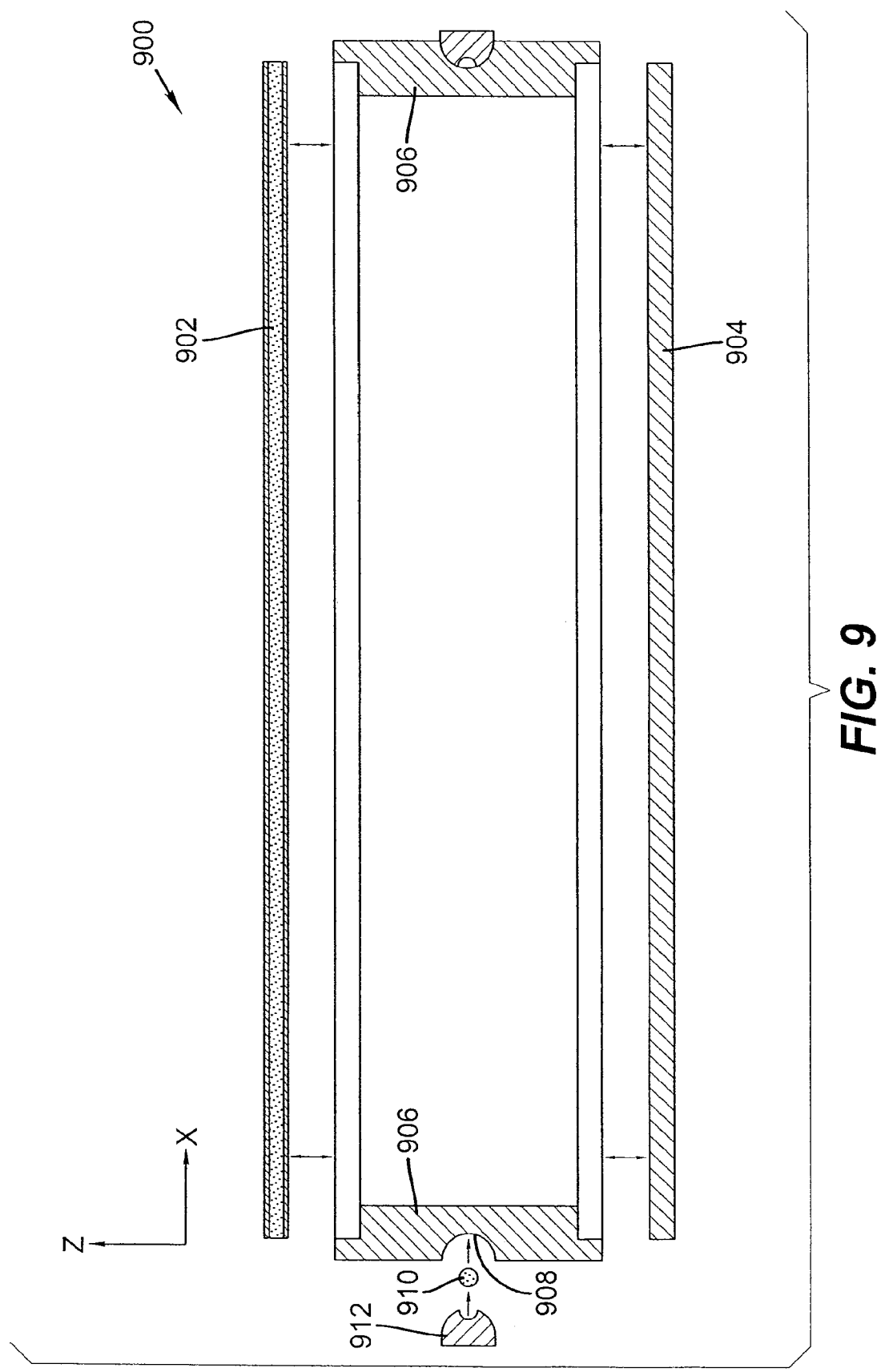
FIG. 9 is a cross-sectional, elevational, diagrammatic view showing an alternate housing construction of an embodiment of the present invention.
Figure 10:
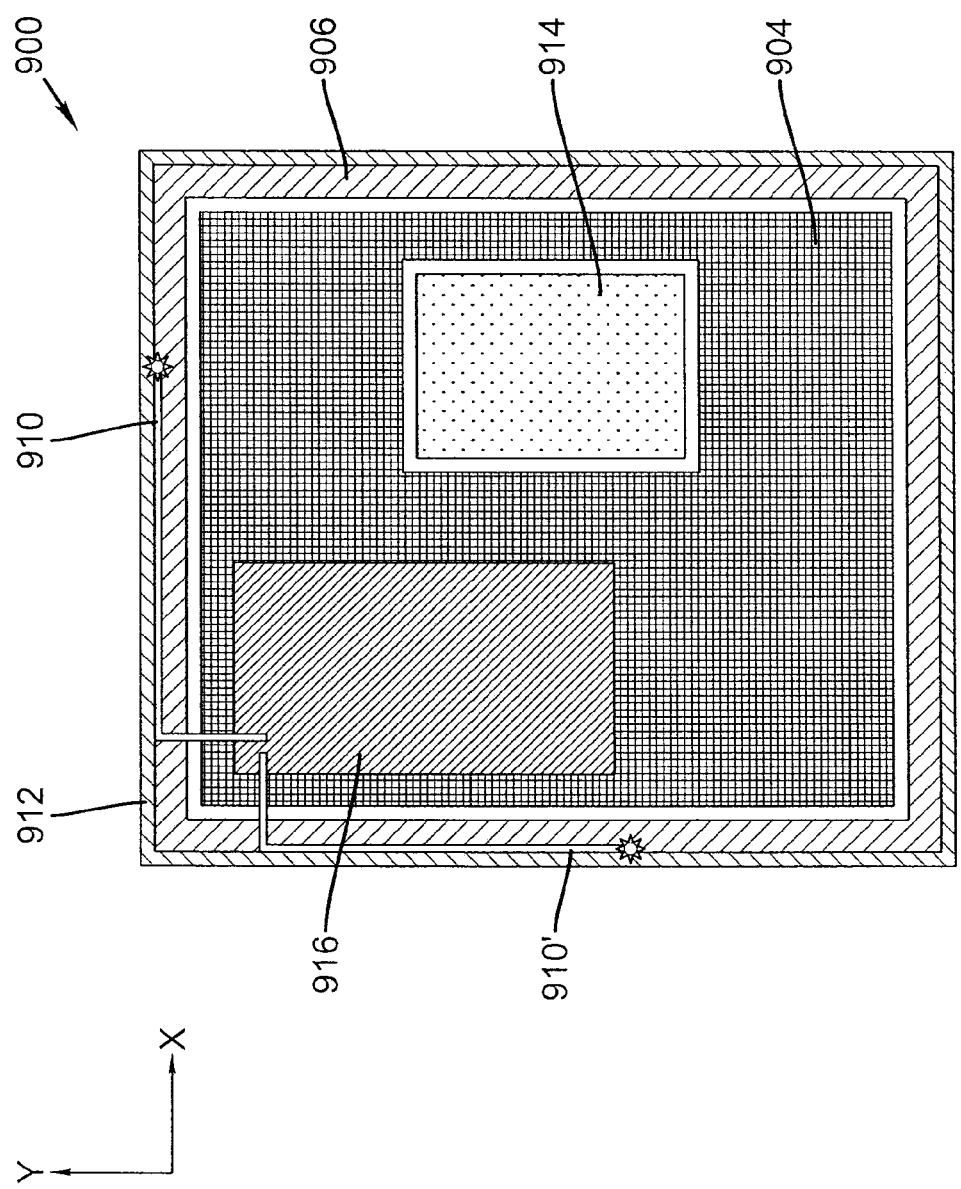
FIG. 10 is top plan, diagrammatic view showing an embedded antenna for the embodiment of FIG. 9.

An alternate housing construction for a DR detector is shown in FIGS. 9 and 10. As shown in FIG. 9, upper and lower casings 902 and 904 of DR detector 900 are attached to a four sided frame 906. An advantage of this configuration is for assembly and test of the detector electronics. The upper casing 902 would first be attached to frame 906. This attachment can be done via conventional fasteners or other adhesive fastening means. The upper casing 902 and frame 906 would be placed upside down, where the foam, screen, detector array, stiffener, and internal frame (see FIG. 4), are placed in that order. All detector electronics would then be attached to the internal frame. Having the lower casing not installed at this point, allows for test and debug of all detector electronics. Once this is completed, the lower casing can be attached via fasteners or other means, thus preloading the entire assembly.

Another advantage of the latter configuration is for x-ray transmission and thermal transfer characteristics. The upper casing as previously discussed, should be made of a material that has good x-ray transmission characteristics such as HYLITE™ or carbon fiber composites. The lower casing is preferably made of a lightweight material that is thermally conductive such as aluminum or magnesium. A thermally conductive material allows a heat dissipation path outside of the detector through a thermal pad material.

Another alternative shown in FIG. 9 is to have a recessed feature around the perimeter of the frame 906 for embedding an antenna. As shown, frame 906 has a recess 908 into which antenna 910 is held in place by insert 912. The frame 906 is preferably made of a metal that is high in stiffness. In order to have enough signal strength for wireless transmission, the antenna would be exterior to any metal components. Having the antenna embedded between the exterior of the frame and insert as shown, helps in signal transmission. The insert 912 is preferably made of a non-metal which does not attenuate the wireless signal, such as plastic or elastomer. The insert 912 would be wrapped around the perimeter of the frame, and bonded against the recess 908. Additionally, the insert 912 can protrude slightly from frame 906, thus providing additional shock isolation in the x-direction for the assembly.

Another view of this structure is shown in FIG. 10, and can have a plurality of antennas 910, 910' embedded in the frame. A plurality of antennas will increase the likelihood of proper signal transmission once the detector assembly is installed in a Bucky. Battery pack holder 914 and electronics 916 are also shown.

Figure 12:
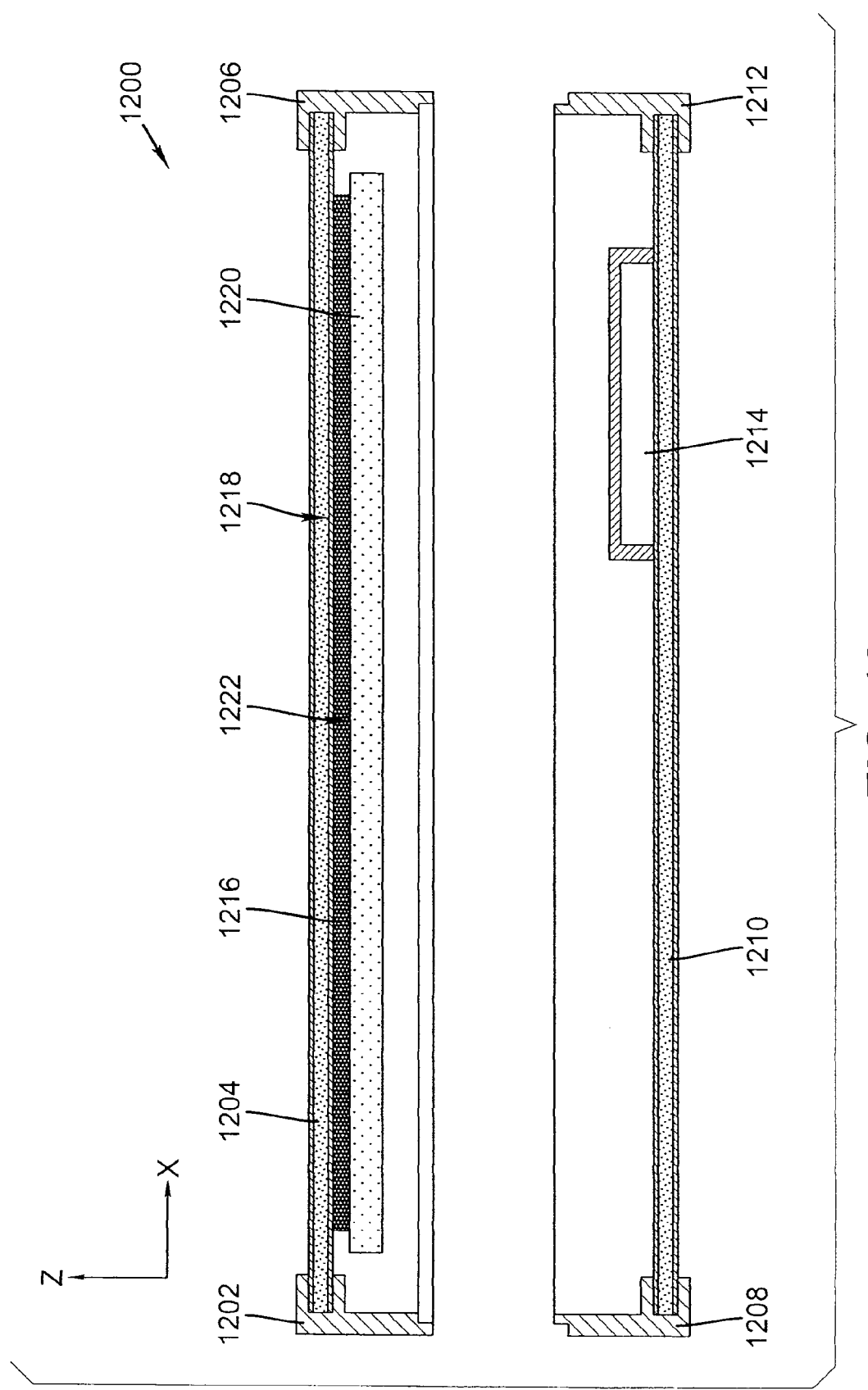
FIG. 12 is a cross-sectional, elevational, diagrammatic view showing an encasement/housing with adhesive bonded screen and detector array of an embodiment of the present invention.
Figure 13:
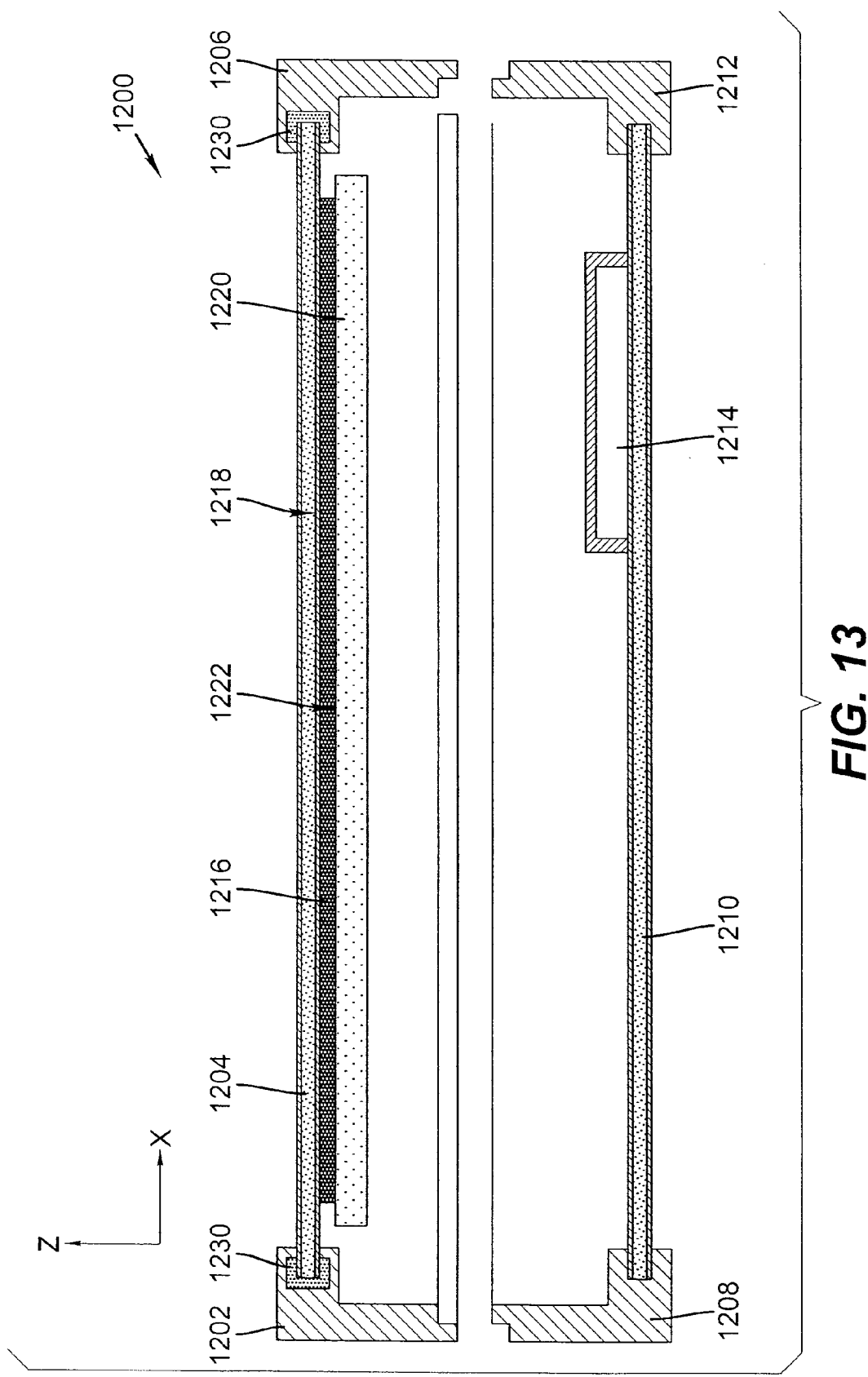
FIG. 13 is a cross-sectional. elevational, diagrammatic view showing an encasement/housing with elastomer in the housing of an embodiment of the present invention.
Figure 14C:
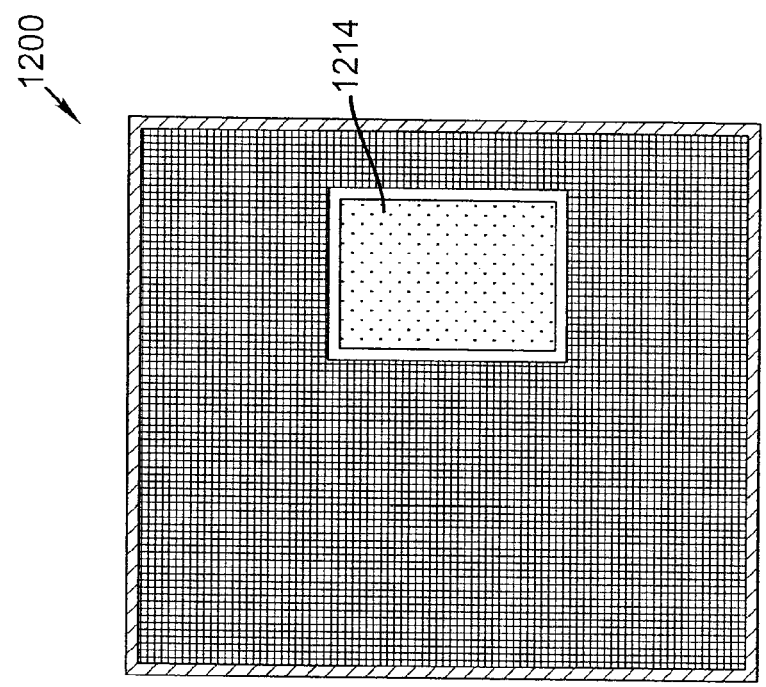
FIGS. 14A, 14B, and 14C are respective top plan, side elevational, and bottom plan diagrammatic views showing an encasement/housing with a battery pack holder and overall thickness of an embodiment of the present invention.
Figure 14B:
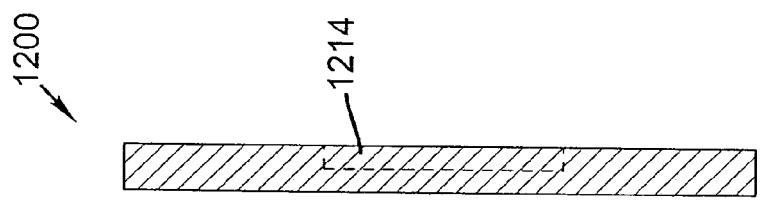
Figure 14A:
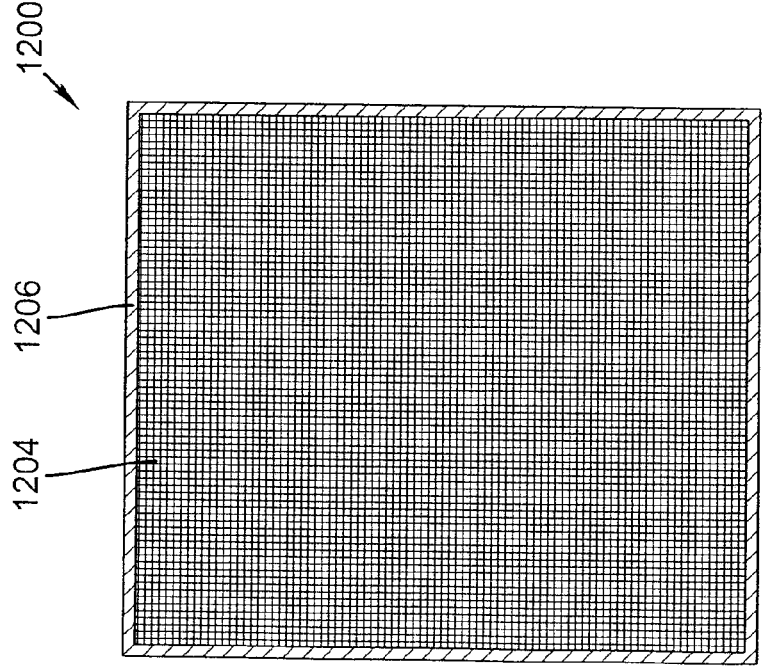
Figure 15:
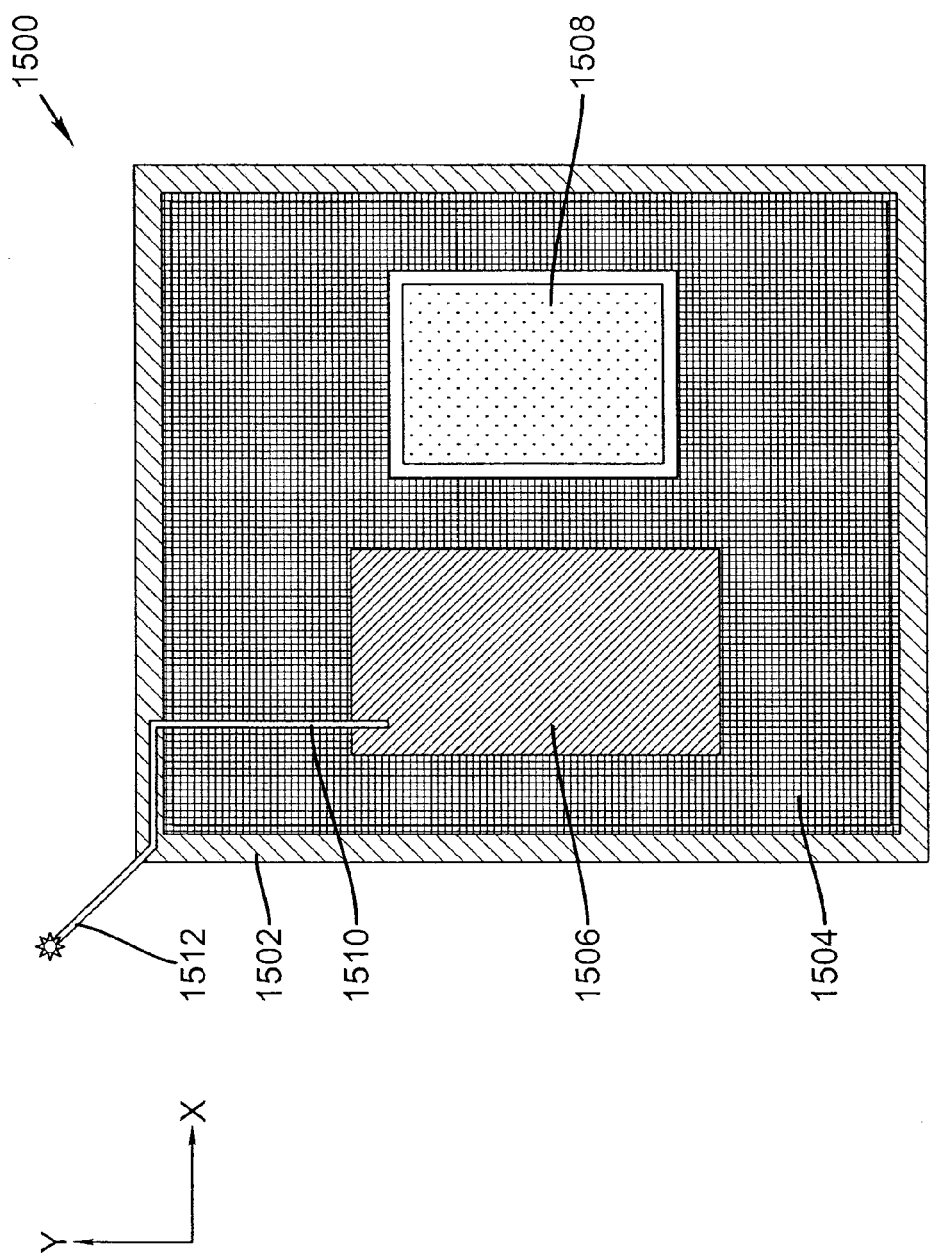
FIG. 15 is a top plan, diagrammatic view showing telescoping and flexible antennas of an embodiment of the present invention.

FIGS. 12, 13, and 14A-14C show another embodiment of the invention. As shown in FIG. 12, DR detector 1200 includes upper housing 1202 having upper casing 1204 and upper frame 1206, and lower housing 1208 having lower casing 1210 and lower frame 1212. Lower casing 1210 has a battery pack holder 1214. Scintillator screen 1216 is attached to upper casing by adhesive 1218 and detector array 1220 is attached to screen 1216 by adhesive 1222. With the understanding that upper casing 1204 is self-rigid, this arrangement can prevent the need for attaching a stiffener to the base of the detector array. Additionally, this configuration can allow more space for packaging electronics, since foam is no longer needed. Another variation shown in FIG. 13 is to have an elastomer 1230 between upper housing frame 1206 and upper casing 1204. This would provide additional shock protection. once the detector array, electronics, and all other components are mounted, the upper and lower housing members are attached and sealed together. Exterior views of the complete DR detector are shown in FIGS. 14A-14C The DR detector shown in FIG. 15 is useful for an application with a wireless interface. As shown, DR detector 1500 has a frame 1502, a casing 1504, electronics 1506, battery pack holder 1508, wireless interface 1510, and flexible or telescoping antenna 1512. The flexible antenna can extend around the detector housing. Some Bucky configurations are surrounded with metal, and this can result in signal strength loss between an internal transmitter within the DR detector and receiver at the DR system level. In this event, an optional antenna would be necessary to extend outside the Bucky.

Portable imaging is another large market opportunity for future DR systems. Portable imaging systems are typically used in emergency rooms, trauma center, or operating room, where fast turnaround of the images is necessary. These systems typically have a mobile-based x-ray source on wheels with a portable cassette using radiographic capture media. Ergonomically, it is desirable to have a handle on these cassettes for portability and to assist during any patient handling and insertion. Further, it is desirable that the portable cassette be extremely light in weight due to frequent handling of the device. An example of today's portable digital radiography detectors is the Canon CXDI-50G. This device has a 35 cm×43 cm specified imaging area, with the overall portable assembly weighing 11 pounds. This is considered too heavy for repeated and daily handling of these devices. An overall detector weight of 8 pounds is considered to be desirable for ergonomic needs.

Figure 16:
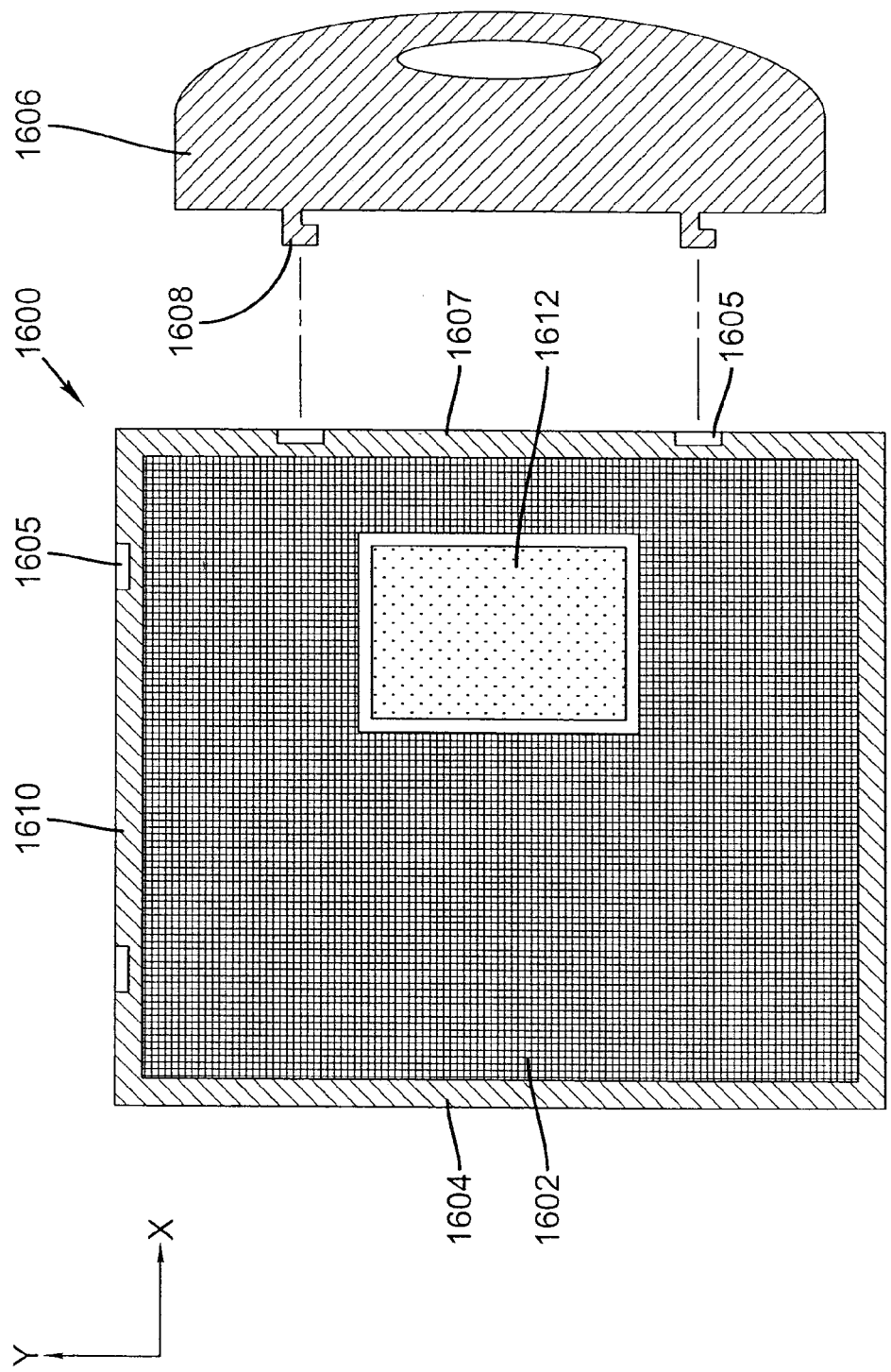
FIG. 16 is a top plan, diagrammatic view showing a detachable handle assembly for portable imaging of an embodiment of the present invention.

It is an object of the present invention to provide a flexible and extensible configuration of the DR detector, so that it can be used for portable imaging, as well as the x-ray exam room applications previously discussed. One embodiment of portable detector configuration is shown in FIG. 16, where a detachable handle can be mounted to a plurality of edges on the DR detector. As shown, DR detector 1600 includes a casing 1602, frame 1604, handle mounting apertures 1605, and battery pack holder 1612. A handle 1606 having latches 1608 is detachably mounted to detector 1600. Latches 1608 of handle 1606 engage with apertures 1605 along the edge 1607 or 1610 of detector 1600. An advantage of this configuration is that the detachable handle can be mounted for landscape or portrait imaging, depending on the ergonomic preference or specific imaging procedure. The attachment of the handle to the DR detector can either be through a quick latch type device, or with conventional fasteners requiring a tool. The latter attachment means could be advantaged if orientation change is not frequently required.

Figure 17:
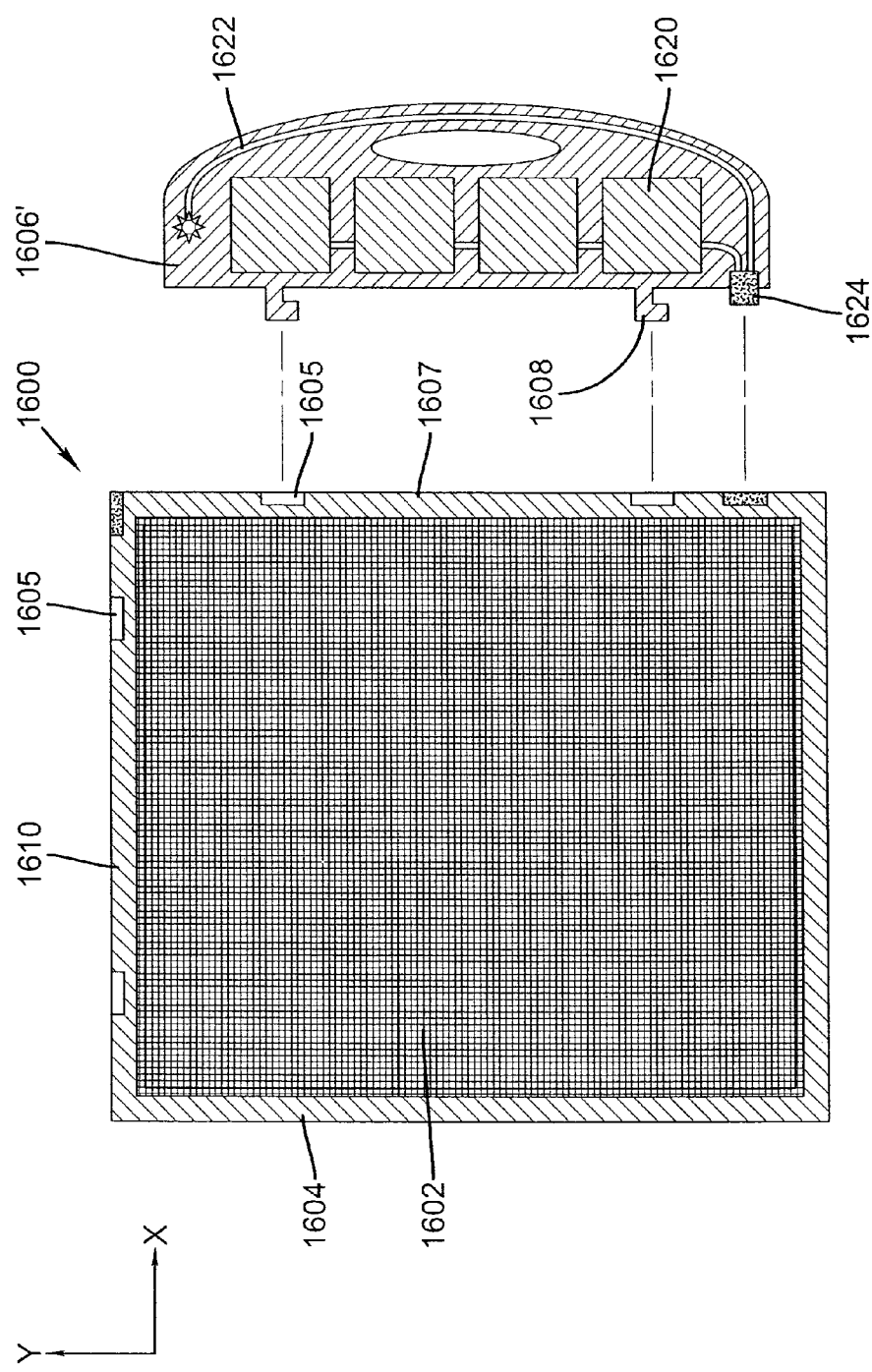
FIG. 17 is a top plan, diagrammatic view showing a detachable handle and battery pack for portable imaging of an embodiment of the present invention.
Figure 18:
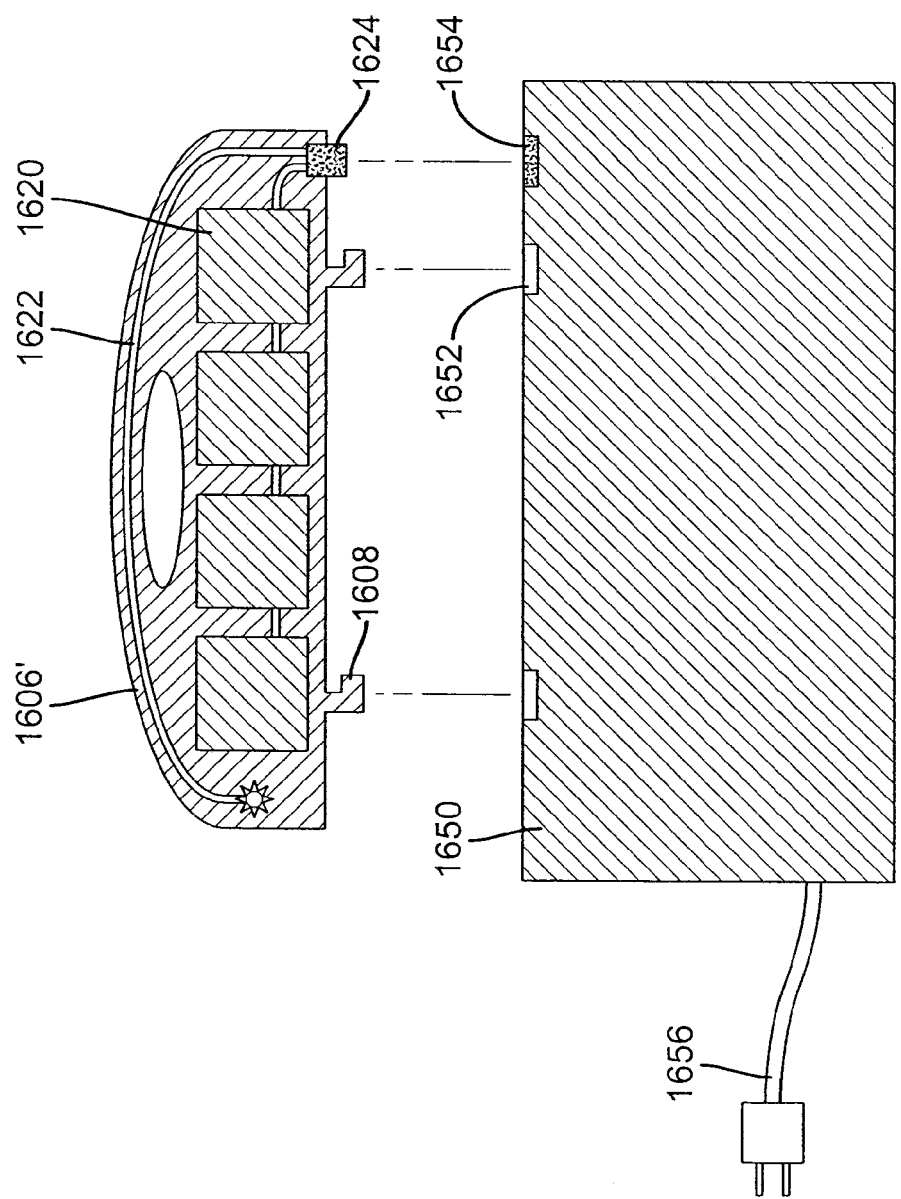
FIG. 18 is a top plan, diagrammatic view of a charging unit for the detachable handle and battery pack of an embodiment of the present invention.

FIG. 17 shows a modification of the system of FIG. 16, in which the detachable handle 1606' includes rechargeable batteries 1620 to power the DR detector 1600, and possibly an antenna 1622 for wireless communication. This extension of the wireless antenna would only be necessary if signal transmission is not adequate as previously discussed, otherwise an antenna embedded in the DR detector housing would be appropriate for portable imaging. A separate charging unit such as shown in FIG. 18 can be used to recharge the rechargeable (e.g., lithium polymer) batteries. As shown, battery charger 1650 has a plug 1656 and a terminal 1654 for engaging with a terminal 1624 on handle 1606' when handle 1606' is mounted in apertures 1652 of charger 1650. In this embodiment, the battery pack embedded in the DR detector would no longer be required. Since the structural components previously discussed are all lightweight composite materials, it is feasible that overall weight of the portable DR detector configuration could achieve 8 pounds maximum.

Figure 19B:
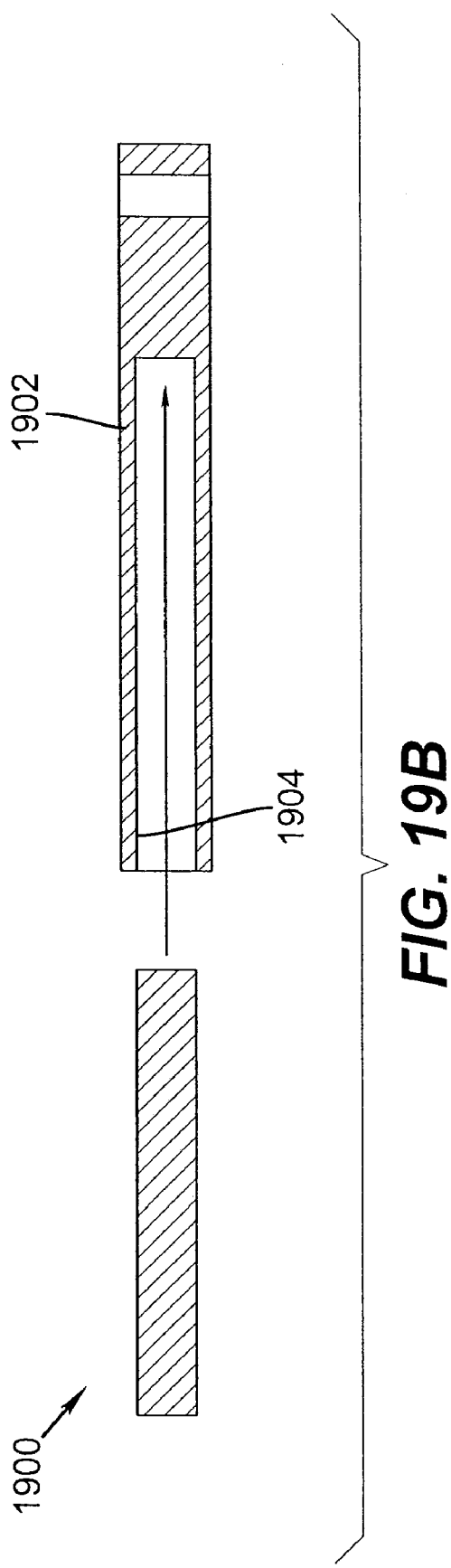
Figure 20:
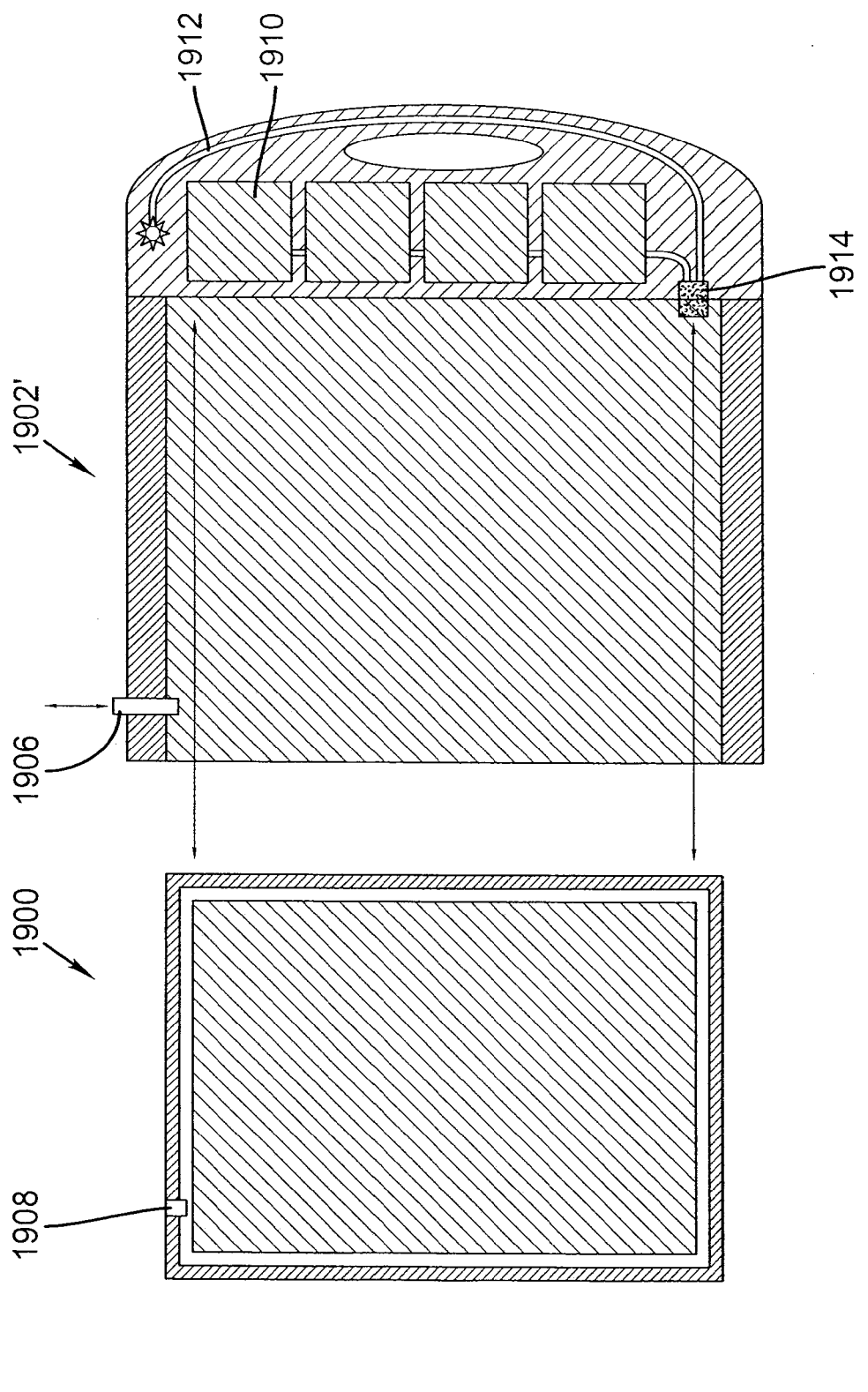
FIG. 20 is a top plan, diagrammatic view showing a detachable carrier and battery pack of an embodiment of the present invention.

FIGS. 19A and 19B show an alternate portable imaging configuration in which the DR detector is detachably mounted in a portable carrier. This configuration provides additional structural rigidity surrounding the DR detector but also adds additional weight. As shown, DR detector 1900 is detachably received in cavity 1904 of portable carrier 1902. Latch pin 1906 on carrier 1902 locks into aperture 1908 on detector 1900. The latch pin facilitates locking and releasing the detector 1900 relative to the carrier 1902. FIG. 20 shows a portable carrier 1902' having rechargeable batteries 1910, antenna 1912, and connector 1914.

Figure 21:
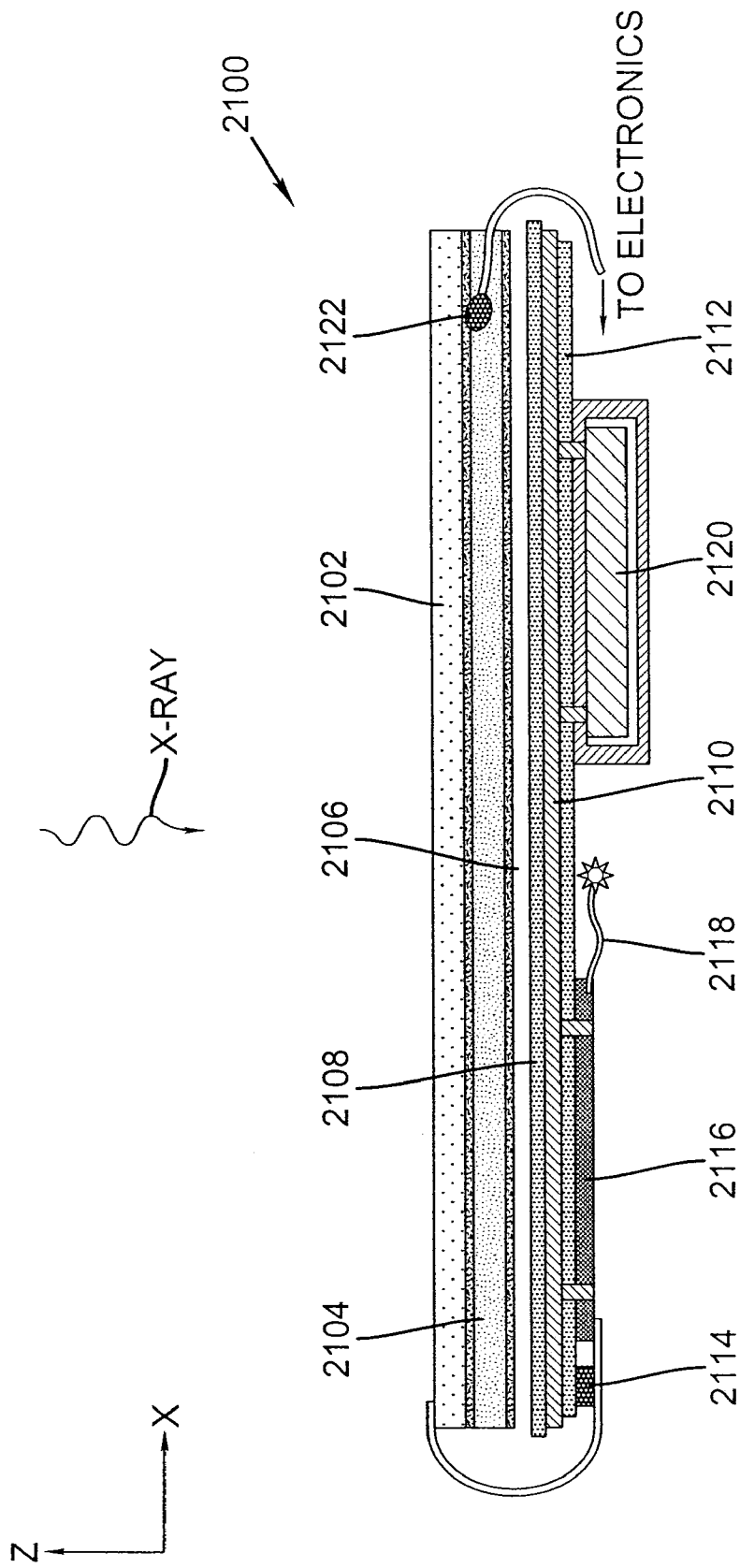
FIG. 21 is a cross-sectional, elevational, diagrammatic view showing the electronics and thermal interfaces of an embodiment of the present invention.

It is known that detector arrays used in today's DR systems are sensitive to temperature variations affecting uniformity of the detector. It is another object of the present invention to provide a passive cooling means to transfer heat away from all heat source components within the DR detector. This would include the electronics, battery, and ASIC electronics attached to the flex circuits as shown in FIG. 21. As shown, components of DR detector 2100 include detector array 2102, stiffener 2104, air gap 2106, lead shield 2108, structural member 2110, thermally conductive member 2112, ASIC 2114, electronics 2116, wireless interface 2118, battery pack 2120, and temperature sensor 2122. Thermally conductive member 2112 is made of thermally conductive material such as Panasonic Pyrolytic Graphite Sheet (PGS). This material is very efficient in transferring heat laterally away from the heat source (X and Y directions), due to the directional orientation of the graphite. The thermally conductive material would be sandwiched between the heat sources as shown, and a thermally conductive structural member 2110 to further dissipate the heat. A lead shield 2108 may be used between the x-ray source and electronics to absorb radiation and prevent possible damage to the electronics over time. Additionally, lead or other heavy metal could be embedded or attached to the stiffener for similar x-ray absorption purposes.

It is preferred that the structural member be separated from the stiffener so that heat is not directly conducted through the stiffener and detector array. This can be accomplished through air gap 2106, or some thermal insulating material such as the foam shown in FIG. 5.

A temperature sensor 2122 or plurality of temperature sensors can be attached in as close proximity to the detector array as possible. The sensor(s) would be used to monitor local or ambient temperature of the detector array through the electronics, and possibly correct for any temperature non-uniformities captured during DR detector manufacturing.

Figure 22:
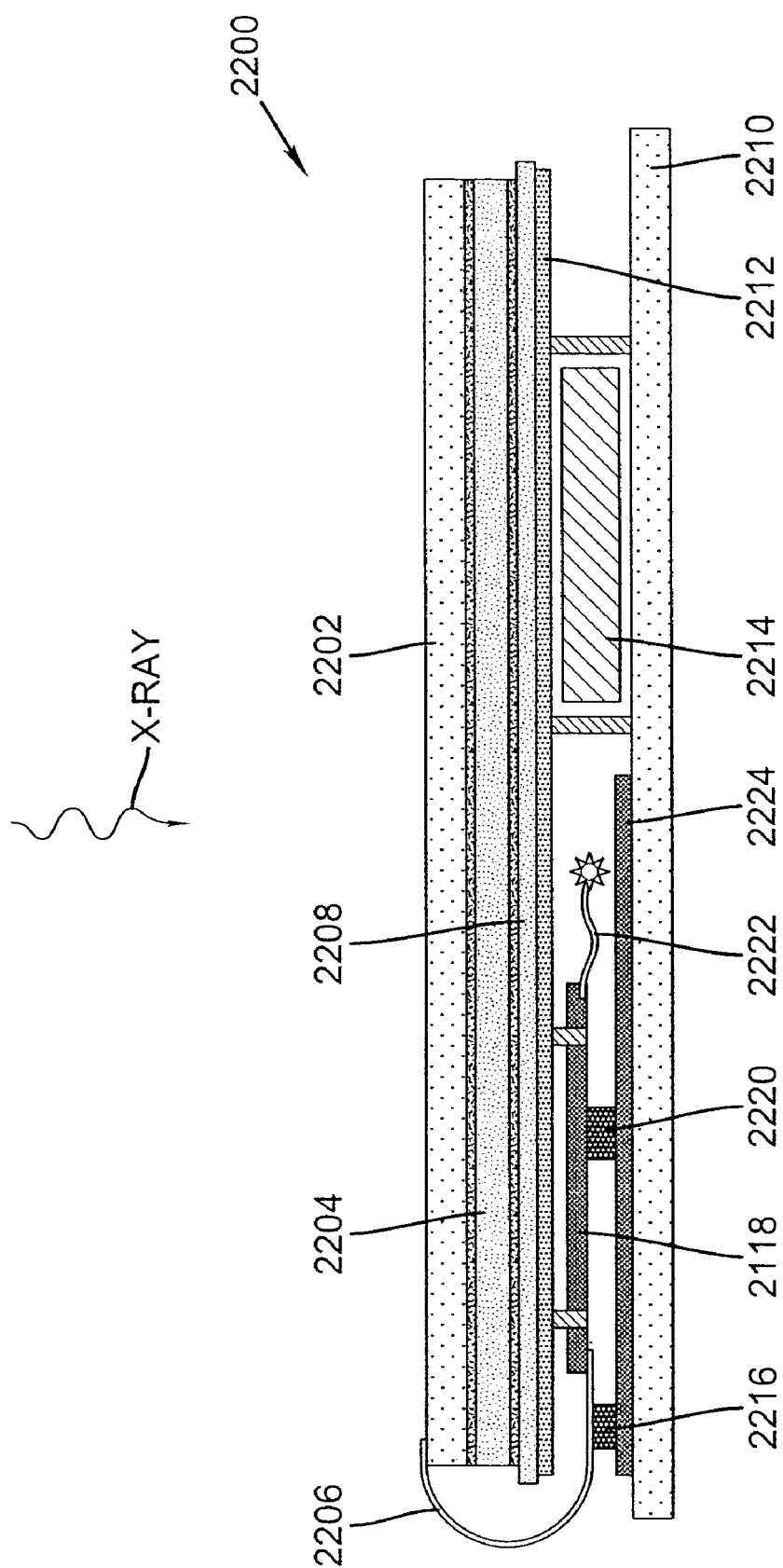
FIG. 22 is a cross-sectional, elevational, diagrammatic view showing alternate electronics and thermal interfaces of an embodiment of the present invention.

FIG. 22 shows another embodiment of thermal management in a DR detector. As shown DR detector 2200 includes detector array 2202, stiffener 2204, flex circuit 2206, lead shield 2208, lower casing 2210, internal frame 2212, battery pack 2214, ASIC 2216, Printed Circuit Board(s) (PCBs) 2218, electronic component(s) 2220, wireless interface 2222, and thermally conductive gap pad 2224. The embodiment allows transfer of heat out of the housing through the lower casing. This allows for natural convection and radiation to remove heat from the outside of the housing. The ASIC and all primary heat dissipating electronic components transfer heat through the thermally conductive pad and the lower casing. A thermally conductive material such as Panasonic PGS can be used for the thermal pad. Alternatively, a thermally conductive gap pad material such as Bergquist 3000S30 could be used. An advantage of a gap pad material is that it will compress and accommodate height differences of electronic components, compared with the very thin Panasonic PGS material. Thickness of gap pad materials range from 0.25-3.0 mm, compared with PGS at 0.10 mm thickness only.

The invention has been described in detail with particular reference to certain preferred embodiments thereof, but it will be understood that variations and modifications can be effected within the spirit and scope of the invention.

| PARTS LIST | |
|---|---|
| 100 | patient |
| 102 | support |
| 104 | x-ray source |
| 106 | x-rays |
| 108 | radiography cassette |
| 110 | x-ray generator and control |
| 112 | antiscatter grid |
| 114, 114' | auto exposure control |
| 116 | detector control |
| 118 | host PC computer |
| 200 | DR detector |
| 202 | upper housing |
| 204 | lower housing |
| 206 | cavity |
| 208 | detector array |
| 210 | stiffener |
| 212 | scintillator screen |
| 214 | compliant foam member |
| 216 | elastomer supports |
| 217 | stop ledges |
| 218 | flex circuits |
| 220 | electronics |
| 222 | wireless interface |
| 224 | battery pack |
| 226 | compartment |
| 228 | structural member |
| 400 | DR detector |
| 402 | upper casing |
| 404 | lower casing |
| 406 | external frame |
| 408 | internal frame |
| 410 | foam layer |
| 412 | screen |
| 414 | detector |
| 416 | stiffener |
| 418 | arrow |
| 420 | flexible circuit |
| 421 | elastomer member |
| 422, 424 | electronics |
| 426 | thermal pad |
| 428 | antenna |
| 430 | battery |
| 440 | arrow |
| 500 | DR detector |
| 502 | upper housing |
| 504 | lower housing |
| 506 | cavity |
| 508 | detector array |
| 510 | stiffener |
| 512 | screen |
| 514, 515 | compliant foam members |
| 516 | elastomer supports |
| 518 | flex circuits |
| 520 | electronics |
| 522 | wireless interface |
| 524 | battery pack |
| 526 | compartment |
| 528 | structural member |
| 700 | DR detector |
| 702 | housing |
| 704 | detector array |
| 706 | flex circuits |
| 708 | elastomer supports |
| 710, 712 | edges |
| 800 | DR detector |
| 802 | upper housing |
| 804 | lower housing |
| 806 | upper casing |
| 808 | upper frame |
| 810 | lower casing |
| 812 | lower frame |
| 814 | battery pack holder |
| 820 | elastomer |
| 900 | DR detector |

| PARTS LIST | |
|---|---|
| 902, 904 | upper and lower casings |
| 906 | frame |
| 908 | recess |
| 910, 910' | antenna |
| 912 | insert |
| 914 | battery pack holder |
| 916 | electronics |
| 1200 | DR detector |
| 1202 | upper housing |
| 1204 | upper casing |
| 1206 | upper frame |
| 1208 | lower housing |
| 1210 | lower casing |
| 1212 | lower frame |
| 1214 | battery pack holder |
| 1216 | scintillator screen |
| 1218 | adhesive |
| 1220 | detector array |
| 1222 | adhesive |
| 1230 | elastomer |
| 1500 | DR detector |
| 1502 | frame |
| 1504 | casing |
| 1506 | electronics |
| 1508 | battery pack holder |
| 1510 | wireless interface |
| 1512 | antenna |
| 1600 | DR detector |
| 1602 | casing |
| 1604 | frame |
| 1605 | apertures |
| 1606, 1606' | handle |
| 1607 | edge |
| 1608 | latches |
| 1610 | edge |
| 1612 | battery pack holder |
| 1620 | rechargeable batteries |
| 1622 | antenna |
| 1624 | terminal |
| 1650 | battery charger |
| 1652 | apertures |
| 1654 | terminal |
| 1656 | plug |
| 1900 | DR detector |
| 1902, 1902' | portable carrier |
| 1904 | cavity |
| 1906 | latch pin |
| 1908 | aperture |
| 1910 | rechargeable batteries |
| 1912 | antenna |
| 1914 | connector |
| 2100 | DR detector |
| 2102 | detector array |
| 2104 | stiffener |
| 2106 | air gap |
| 2108 | lead shield |
| 2110 | structural member |
| 2112 | thermally conductive member |
| 2114 | ASIC |
| 2116 | electronics |
| 2118 | wireless interface |
| 2120 | battery pack |
| 2122 | temperature sensor |
| 2200 | DR detector |
| 2202 | detector array |
| 2204 | stiffener |
| 2206 | flex circuit |
| 2208 | lead shield |
| 2210 | lower casing |
| 2212 | internal frame |
| 2214 | battery pack |
| 2216 | ASIC |
| 2218 | PCB(s) |
| 2220 | electronic component(s) |
| 2222 | wireless interface |
| 2224 | thermally conductive gap pad |

The invention claimed is:

1. A digital radiography detector assembly comprising:
a digital radiography detector having a housing having first and second planar members and four side walls;
a scintillator screen and a detector array bonded to the first planar member of the housing;
an elastomeric member between the bonded first planar member, the scintillator screen and the detector array, and each of two side walls;
a portable assembly detachably mounted to the detector; wherein the portable assembly includes at least one handle detachably mounted to a side wall of the detector housing, and wherein the at least one handle includes one or more of a battery and antenna that can be connected to the detector when the handle is mounted to the detector housing.

2. The detector assembly of claim 1 wherein the portable assembly includes at least two handles detachably mounted to at least two side walls of the detector housing.

3. The detector assembly of claim 1, wherein the digital radiography detector includes at least a first antenna connected to the digital radiography detector through a first side wall and a second antenna connected to the digital radiography detector through a second side wall adjacent the first side wall, wherein the first antenna is used for transmission of image data when the detector assembly is used in a first configuration and the second antenna is used for the transmission of image data in the second configuration.

4. The detector assembly of claim 3, wherein the first configuration is a landscape orientation of the digital radiography detector in a radiographic imaging apparatus and the second configuration is a portrait orientation of the digital radiography detector in the radiographic imaging apparatus.

5. The detector assembly of claim 3, wherein the first antenna is used when the at least one handle is connected to a first side wall and the second antenna is used when the at least one handle is connected to a second side wall.

6. The detector assembly of claim 1, comprising a separate charging unit configured to connect to an external power supply, wherein the at least handle to include a connector to connect the battery to the separate charging unit to charge the battery.

* * * * *